United States Patent
Shi et al.

(10) Patent No.: US 10,460,763 B2
(45) Date of Patent: Oct. 29, 2019

(54) GENERATING AUDIO LOOPS FROM AN AUDIO TRACK

(71) Applicant: Adobe Inc., San Jose, CA (US)

(72) Inventors: Zhengshan Shi, Palo Alto, CA (US); Gautham J. Mysore, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 293 days.

(21) Appl. No.: 15/497,433

(22) Filed: Apr. 26, 2017

(65) Prior Publication Data
US 2018/0315452 A1  Nov. 1, 2018

(51) Int. Cl.
G06F 3/048 (2013.01)
G11B 27/00 (2006.01)
G10H 1/00 (2006.01)
H04H 60/04 (2008.01)

(52) U.S. Cl.
CPC ......... *G11B 27/007* (2013.01); *G10H 1/0025* (2013.01); *G10H 1/0041* (2013.01); *H04H 60/04* (2013.01); *G10H 2210/056* (2013.01); *G10H 2210/061* (2013.01); *G10H 2210/076* (2013.01); *G10H 2210/105* (2013.01); *G10H 2220/116* (2013.01); *G10H 2250/641* (2013.01)

(58) Field of Classification Search
CPC .......... G06F 3/00; G06F 3/048; G06F 3/0481; G06F 3/0482; G06F 3/0484; G06F 9/4443; G06F 3/16; G11B 27/00; G10H 1/00; H04H 60/04
See application file for complete search history.

(56) References Cited

U.S. PATENT DOCUMENTS

| 9,280,961 B2 * | 3/2016 | Eronen | G10H 1/00 |
| 9,502,017 B1 * | 11/2016 | Becherer | G10H 1/0025 |
| 2016/0372095 A1 * | 12/2016 | Lyske | G10H 1/40 |

OTHER PUBLICATIONS

Ong, B., and Streich, S. Music loop extraction from digital audio signals. IEEE International Conference on Multimedia and Expo (2008), 453-469.
Rubin, S., B. F. M. G. J. L. W., and Agrawala, M. Content-based tools for editing audio stories. In Proc. The 26th annual ACM symposium on User interface software and technology, ACM (2013), 113-122.
Wave surfer plugin. https://wavesurfer-js.org/. As accessed Jan. 19, 2017.
Whitman, B. The Infinite Jukebox. http://labs.echonest.com/Uploader/index.html. As accessed Jan. 19, 2017.

* cited by examiner

Primary Examiner — Xiomara L Bautista
(74) Attorney, Agent, or Firm — Keller Jolley Preece

(57) ABSTRACT

Methods and systems for automatic audio loop generation from an audio track identify suitable portions of the audio track for generating audio loops. One or more embodiments identify portions of the audio track that include a beginning beat and an ending beat that have similar audio features that provide for seamless transitions when generating the audio loops. One or more embodiments generate scores for the portions based on the similarity of the audio features of the corresponding beginning and ending beats. Additionally, one or more embodiments use the generated scores to determine whether each portion is a suitable audio loop candidate. One or more embodiments then generate one or more audio loops using one or more suitable portions of the audio track.

20 Claims, 13 Drawing Sheets

GENERATING AUDIO LOOPS FROM AN AUDIO TRACK

BACKGROUND

Musical composers or other content creators often create music that includes a consistent tone or emotion throughout an entire musical piece or within certain sections of a musical piece. To achieve the consistent tone or emotion in a musical piece, some content creators create repeatable music patterns throughout the piece. For example, a musical piece can include a combination of musical beats (e.g., an arrangement of notes and rhythms) that are repeatable throughout the musical piece, referred to as a music loop. In particular, some content creators use conventional audio editing systems to create music loops from prerecorded audio as a basis for creating new musical pieces, a practice known as sampling.

While conventional audio editing systems may allow a user to ultimately create a music loop from a previously generated musical piece, conventional audio editing systems have several drawbacks and disadvantages. In particular, creating a musical loop with conventional audio editing software requires audio editing skills, which is time consuming and requires a good amount of musical background. A user first identifies a portion of music that would be a good candidate for a music loop. Accordingly, with conventional audio editing systems, users often spend large amounts of time, in a trial-and-error process, attempting to identify a portion of an audio file that could musically become an audio loop, and often ultimately fail to identify a suitable portion of an audio file that can be used to create a high-quality loop.

In addition, even when a user identifies a useable portion of an audio file at a general level, conventional audio editing systems often require the user to manually fine tune the selection of the start point and the endpoint, which is a much more time-intensive process. Indeed, even for experienced users, manually finding the precise locations of the start point and the endpoint that makes a seamless music loop requires many micro adjustments (e.g., to make a music loop sound natural when transitioning from the endpoint back to the start point). Even for experienced users, for example, the process of fine-tuning an audio loop requires a significant time commitment. For average or novice users, however, the process of making the micro-user adjustments is not only time intensive, but all-too-often does not result in a quality loop.

These and other disadvantages may exist with respect to conventional audio editing techniques.

BRIEF SUMMARY

Embodiments of the present disclosure provide benefits and/or solve one or more of the foregoing or other problems in the art with systems and methods that create audio loops from prerecorded audio. In one or more embodiments, the systems and methods analyze an audio track to automatically identify portions of the audio track that are suitable for generating audio loops based on a similarity of audio features of beginning and ending beats of the portions of the audio track. Upon identifying a suitable portion of an audio track, the systems and methods generate an audio loop using the identified portion by automatically creating a transition between the ending beat and beginning beat of the identified portion of the audio track. Accordingly, the disclosed systems and methods provide an intuitive and time-efficient process that automatically generates high quality audio loops from prerecorded audio.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which.

DETAILED DESCRIPTION

Figure 1:
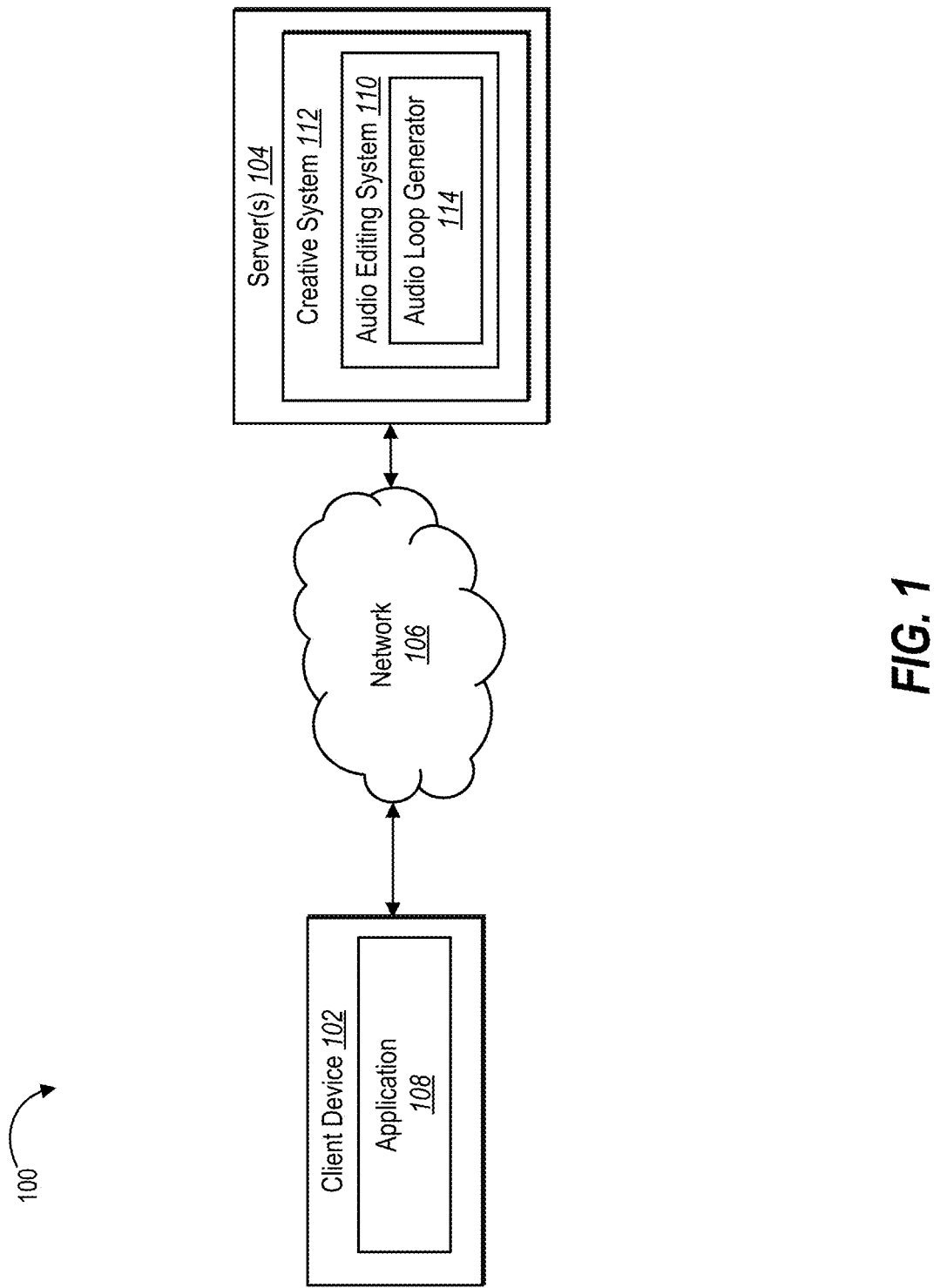
FIG. 1 illustrates an example computing environment within which an audio editing system can operate in accordance with one or more embodiments.

One or more embodiments of the present disclosure provide an audio editing system that generates audio loops. In particular, the audio editing system analyzes a prerecorded digital audio track (or simply "audio track") to generate one or more audio loops from portions of the prerecorded digital audio track. In one or more embodiments, the audio editing system analyzes groups of sequential beats within a prerecorded audio track to identify one or more portions of the audio track that are suitable for generating a high-quality audio loop (e.g., portions of the audio track that have characteristics to create a quality audio loop). Furthermore, after determining that a given portion of an audio track is a suitable candidate, the audio editing system further analyzes and processes the portion of the audio track to create a seamless transition between the ending of the portion of the audio track and the beginning of the portion of the audio track to generate an audio loop. Thus, a user can utilize the audio editing system to efficiently generate a high-quality audio loop in a fast and intuitive manner.

In one or more embodiments, and in order to identify or otherwise detect a portion of a prerecorded audio track that is capable of creating a high-quality audio loop, the audio editing system sequentially analyzes the audio track to identify candidate audio loop portions of the audio track. Specifically, the audio editing system identifies a plurality of candidate portions that start at a common beginning beat and end at different ending beats, where a beat represents a basic music pulse in the music within an audio track that groups the music within the audio track into bars and phrases. As such, a beginning beat of a candidate portion is a first music pulse at the beginning of the candidate portion, and an ending beat of a candidate portion is a last music pulse at the end of the candidate portion. Accordingly, each candidate portion that the audio editing system identifies with respect to the common beginning beat has a different length (i.e., a different number of beats). The audio editing system sequentially selects a next beginning beat (e.g., the next beat after the previous beginning beat) and repeats this process to thoroughly analyze the prerecorded audio track to identify all portions capable of creating an audio loop.

In addition to systematically and thoroughly identifying various candidate audio loop portions of a prerecorded audio track, the audio editing system analyzes each of the identified portions to determine the suitability of each of the candidate portions for use in generating an audio loop. The audio editing system, for example, determines the suitability of each identified candidate portion for generating an audio loop by comparing an audio profile (e.g., a set of audio features) of a beginning beat (or one or more beats at the beginning of a candidate portion) and an ending beat (or one or more beats at the end of the candidate portion) of each identified candidate portion.

For example, the audio editing system compares the harmony, timbre, and energy of one or more beginning beats and one or more ending beats to calculate a feature distance, or in other words, a difference in audio features between the audio profile of the beginning beat and the audio profile of the ending beat of a given candidate portion. Moreover, based on the similarity of the audio features of the beginning beat and the ending beat represented by the feature distance, the audio editing system generates a score for the candidate portion that represents the suitability of the particular portion to generate an audio loop. For example, the smaller the feature distance between the beginning beat and the ending beat of a given candidate portion, the higher the score for the candidate portion. Accordingly, based on the scores associated with each identified candidate portion, the audio editing system can identify one or more portions of the audio track that are suitable for generating a high-quality audio loop (e.g., assuming the audio track includes at least one audio loop candidate portion).

In addition to automatically identifying candidate audio loop portions within an audio track and analyzing the candidate audio loop portions to determine portions suitable for creating a high-quality audio loop, the audio editing system further generates audio loops based on the determined portions suitable for creating a high-quality audio loop. Specifically, once the audio editing system has identified a suitable portion of an audio track, the audio editing system creates a seamless, repeatable audio loop by applying one or more audio processing techniques to the beginning beat(s) and ending beat(s) of the identified portion. For instance, the audio editing system creates a seamless transition by automatically applying a crossfade from an ending beat of the identified portion to a beginning beat of the identified portion. Because the audio features of the beginning beat(s) and the ending beat(s) are similar, applying a crossfade allows the audio editing system to create a transition that sounds natural during playback of the audio loop.

Accordingly, the audio editing system provides a user with several audio loops from a single audio track, while at the same time, significantly reducing the amount of time and effort that conventional systems often require to identify and generate an audio loop. Due to automatically identifying audio loops based on an analysis of audio features within the audio track, the audio editing system also suggests potential audio loops to a user that the user may not have otherwise discovered. Moreover, by generating audio loops after automatically identifying and selecting audio loop portions having characteristics and features suitable for creating a high-quality audio loop, the audio editing system enables users to create high-quality audio loops easily and quickly compared to conventional methods.

Additionally, the audio editing system reduces the time and expertise that is typically associated with editing a portion of digital audio from an audio track to generate a high-quality audio loop. Specifically, obtaining a satisfactory audio loop result with conventional systems can require audio editing talent and years of experience that many users will never be able to gain (e.g., due to a shortage of time or due to physical limitations such as hearing loss). Thus, by automating the refinement of a user-selected portion of an audio track using the systems and methods described herein to create an audio loop, the audio editing system efficiently produces high-quality audio loops regardless of a given user's experience or other limitations.

As used herein, the term "audio loop" refers to an audio segment that is based on a portion of an audio track, and that is designed to successively be played in a repeating manner (e.g., played in a "loop"). For instance, an audio loop refers to digital data that comprises portions of an audio track that, when processed successively by a computing device, produces a repeatable segment of sound. To illustrate, an audio loop can include a plurality of beats that play in sequence and then repeat after completing the sequence.

As used herein, the term "beat" refers to an instance of a basic music pulse within an audio track that, when combined with other instances of beats, groups the music within the audio track into bars and phrases. Accordingly, a beat is the basic unit of musical timing within the audio track. For instance, a beat can correspond to a music pulse generated by one or more instrumental or vocal sounds, and can combine with additional beats to create a rhythm, pattern, or musical meter within an audio track.

As used herein, the term "beginning beat" refers to a first beat in a portion of an audio track. Similarly, the term "ending beat" refers to a last beat in a portion of an audio track. Accordingly, an audio loop includes a plurality of beats that repeat by playing from the beginning beat to the ending beat (including any intervening beats), and then returns to the beginning beat to continue playback. In at least some instances, a generated audio loop uses a crossfade technique to overlap the beginning beat and the ending beat of the audio portion for repeatable playback.

As used herein, the term "portion of an audio track" refers to a plurality of beats of an audio track. Specifically, a portion of an audio track includes a beginning beat, an ending beat, and one or more intervening beats. As described in more detail below, a plurality of portions of an audio track can include a "common beginning beat," (i.e., the same beginning beat for each portion) and different ending beats, such that each portion starting at the common beginning beat includes a different number of beats. Accordingly, the audio editing system can analyze each portion starting at the common beginning beat to determine whether any of the candidate portions are suitable for generating an audio loop.

As used herein, the term "audio profile" refers to audio data associated with a beat of an audio track. Specifically, an audio profile for a given beat includes information that describes how the given beat sounds. For instance, an audio profile of a given beat can include a set of audio features of the given beat, where when considered in combination, the audio features determine the audio profile of the given beat. In some embodiments, an audio profile can include a single audio feature, whereas in other embodiments, an audio profile can include multiple audio features.

As used herein, the term "audio feature" refers to a specific audio characteristic. An audio feature corresponds to a function or value that defines the corresponding audio characteristic of the audio feature for the given beat. For example, audio features can include chroma vectors, Mel-Frequency Cepstral Coefficients (MFCCs), and root mean square (RMS) energy that indicate the harmony, timbre, and energy of a beat. In addition, audio features can refer to intensity, volume, pitch, tone and/or other measurable audio characteristics. In one or more embodiments, the audio editing system determines audio characteristics by analyzing sound waves, as will be discussed in greater detail below.

In one or more embodiments, the audio editing system reduces processing loads on a computing device by reducing the amount of time and processing steps needed to generate an audio loop. Indeed, in one or more embodiments, the audio editing system reduces the processing resources required to create a high-quality audio loop by eliminating (often many) manual processing iterations to identify, refine, and generate the audio loops. For instance, manual audio loop creation often involves a user selecting a portion of an audio track, importing the portions into a new project, adjusting one or more audio features of the portion, and then applying filters and/or other audio processing techniques in several different attempts to convert the portion into an audio loop. The audio system described herein eliminates one or more of these activities, and thus, reduces the overall processing load for the computing device.

Turning now to the figures, additional details will be provided with respect to the audio editing system. As described briefly above, the audio editing system provides automatically generated audio loops from an audio track or from a specified region of an audio track. FIG. 1 illustrates an example environment 100 in which a user can perform operations for generating audio loops from digital audio tracks. The environment 100 includes a client device 102 and server(s) 104 that communicate via a network 106. Although FIG. 1 illustrates a single client device 102 in communication with server(s) 104, the server(s) 104 may communicate with any number of client devices associated with any number of users. Additionally, while FIG. 1 describes certain details associated with devices and components associated with an audio editing system 110, FIG. 6 describes additional components and functionalities of the audio editing system 110 in more detail.

As shown in FIG. 1, the audio editing system 110 includes an audio loop generator 114 for creating audio loops from existing audio content. The audio loop generator 114 allows a user of the client device 102 to automatically create one or more audio loops from a selection of digital audio (e.g., from an audio track file). Specifically, the audio loop generator 114 analyzes digital audio to identify and generate one or more repeatable audio loops from portions of the digital audio, and provides the generated audio loops to the user within, as described in more detail below with respect to FIGS. 2A-3B.

As will be described in detail below, the audio loop generator 114 analyzes beats within an audio track to identify candidate audio loop portions, and select candidate audio loop portions that have characteristics and features to generate a high-quality audio loop. In one or more embodiments, the audio loop generator 114 detects a beat, or a sequence of beats, by analyzing the audio profile (e.g., amplitude and period) to detect one or more beats within an audio track. In addition, the audio loop generator 114 can detect on-beats, off-beats, back-beats, cross-beats, hyper-beats, or other types of beats that determine a rhythm or timing of music within an audio track.

Each of the client device 102 and the server(s) 104 also include one or more components. As illustrated, the client device 102 includes an application 108 that allows a user to view, modify, and/or otherwise interact with an audio track when performing one or more functions associated with audio loop generation. For example, a user can interact with the application 108 via a user interface on the client device 102 to communicate with an audio editing system 110 on the server(s) 104 to generate audio loops from an audio track. As described in more detail below, the application 108 can allow a user to import, open, access, or otherwise input an audio track into the application for automatically generating audio loops from the audio track for use with other audio projects. To illustrate, the user can select one or more automatically generated loops for use in creating new music or for modifying the current or another existing audio track.

Furthermore, the server(s) 104 can include the audio editing system 110 as part of a creative system 112 that allows one or more users to access various tools or processes associated with creating, editing, and sharing content. For example, the audio editing system can be implemented on one or more server devices that communicate with the client device 102 via the network 106 (e.g., a local network or the Internet) to perform one or more of the operations of generating audio loops. Thus, the audio editing system may be implemented as a stand-alone application, such as a desktop or mobile application, or as one or more web-based applications hosted on a remote server. Furthermore, the audio editing system may be implemented in a suite of mobile device applications or "apps." To illustrate, the creative system 112 can include one or more applications such as, but not limited to, applications in ADOBE® CREATIVE CLOUD®, ADOBE® AUDITION®, ADOBE® PREMIERE® PRO, and ADOBE® PREMIERE® ELEMENTS. "ADOBE", "CREATIVE CLOUD", "ADOBE AUDITION", "ADOBE PREMIERE PRO", and "ADOBE PREMIERE ELEMENTS" are registered trademarks of Adobe Systems Incorporated in the United States and/or other countries.

Although the environment 100 in FIG. 1 illustrates a specific configuration of hardware and software, the environment 100 can include other configurations of hardware and/or software. For example, the environment 100 may include any number of additional or alternative components (e.g., any number of server(s), client devices, or other devices). To illustrate, the audio editing system 110 may be implemented in a distributed server environment (e.g., a cloud storage system) that allows a plurality of client devices to access the audio editing system 110 via the network 106. In one or more alternative embodiments, the audio editing system 110 runs on a single computing device such as the client device 102, such that the client device 102 can perform all of the operations for generating audio loops from an audio track by itself. Additionally, the audio editing system may be implemented as one or more operating systems, in one or more stand-alone applications, as one or more modules of an application, as one or more plug-ins, as one or more library functions or functions that may be called by other applications, and/or as a cloud-computing model.

Figure 7:
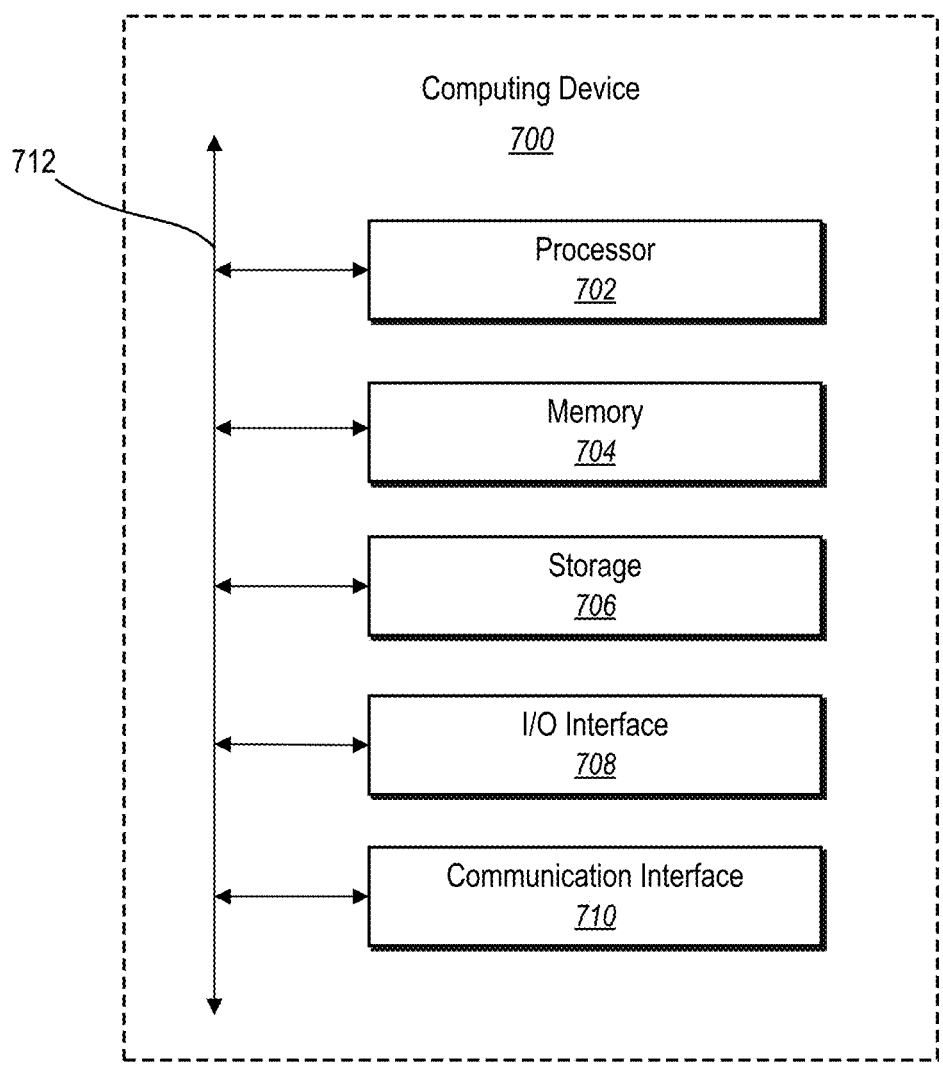
FIG. 7 illustrates a block diagram of an exemplary computing device in accordance with one or more embodiments.

As described herein, the client device 102 can be any computing device that allows the user to view data on a display device and provide inputs via one or more input methods. For example, the client device 102 can be a desktop computing device, laptop computing device, handheld computing device (e.g., a mobile phone or tablet), or other computing device. Additionally, inputs to the client device 102 can include, but are not limited to, peripheral devices (e.g., a mouse or touchpad) or a touchscreen input. Similarly, the server(s) can include any type of computing device capable of implementing the audio editing system 110, and in some instances, the creative system 112 and related software applications. FIG. 7 and the accompanying description provide additional details associated with possible computing devices and components.

Figure 2A:
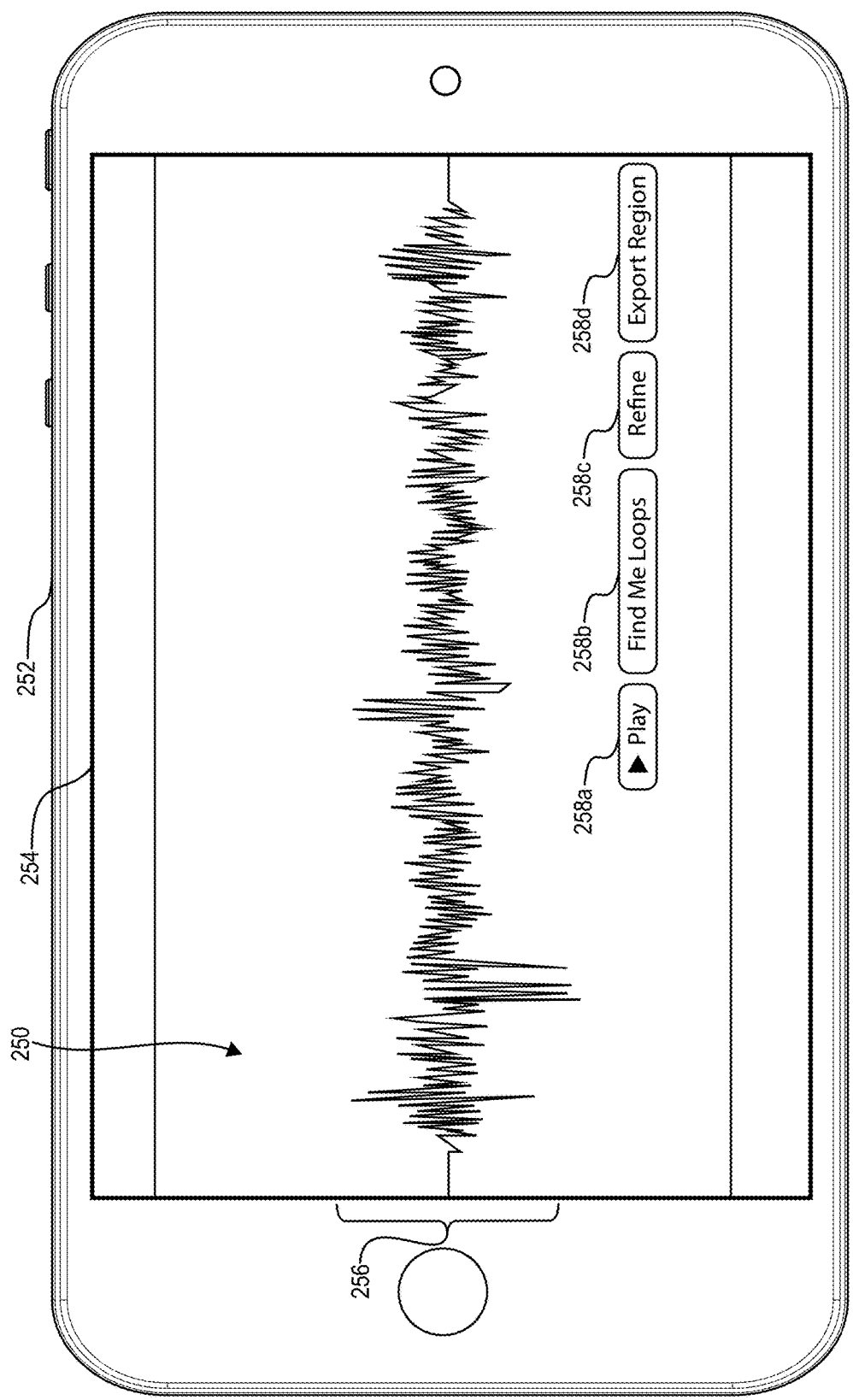
FIG. 2A illustrates an example user interface of an audio editing system presenting an audio track in accordance with one or more embodiments.

As illustrated, FIG. 2A illustrates a user interface 250 that a client device 252 provides on a display device 254. The client device 252 provides, via the user interface 250, a waveform 256 that is a visual representation of an audio track. As used herein, the term "audio track" refers to digital data that, when processed by a computing device (e.g., client device 252), produces sound. For example, an audio track includes digital audio data (e.g., a digital audio file comprising digital audio data) corresponding to audio signals that have been encoded in digital form. In addition, an audio track can include one or more audio channels, audio signals within a wide-range of frequencies, and various types of digital audio (e.g., music, vocal, spoken voice, nature sounds).

For example, the audio track represented by waveform 256 shown in FIG. 2A can include a digital music track that a user accesses from within, or otherwise imports into, the audio editing system to create one or more audio loops based on the audio track. As used herein, the term "audio loop" refers to an audio segment that is based on a portion of an audio track, and that is designed to successively be played in a repeating manner (e.g., played in a "loop"). Accordingly, an audio loop refers to digital data that comprises portions of digital data of an audio track that, when processed successively by a computing device (e.g., client device 252), produces a repeatable segment of sound.

Note, an audio loop often does not include the exact digital data as the portion of an audio track on which the audio loop is based because the audio editing system may modify various audio features and characteristics to create the audio loop. For instance, to create an audio loop, the audio editing system may modify digital data so that the resulting audio segment has a natural or acoustically smooth transition from the end of the audio segment to the beginning of the audio segment when played in a continuously repeating manner. In other words, an audio loop does not have a noticeable (e.g., human perceivable) unnatural or acoustically harsh transition from the end of the audio segment to the beginning of the audio segment when played in a continuously repeating manner. Accordingly, a beginning and an ending of an audio loop include audio features that allow a transition from the end of the loop to the beginning of the loop to sound natural as the audio loop repeats.

FIG. 2A illustrates that the user interface 250 includes a waveform 256 of the audio track and a plurality of controls 258a-d for interacting with the waveform. The waveform 256 is a visual representation of the audio track that illustrates characteristics or features of audio signals within the audio track over time. For example, the wavelength of the waveform 256 can indicate a frequency of an audio signal within the audio track over time, while the amplitude of the waveform 256 indicates a sound pressure (e.g., intensity) of an audio signal within the audio track over time. The waveform 256 can be useful in editing and/or otherwise interacting with audio tracks as it provides a visual representation of various audio properties.

In particular, the user interface 250 of the audio editing system allows a user to interact with the waveform 256 via one or more of the plurality of controls 258a-d. In particular, the plurality of controls 258a-d includes a playback control 258a, a loop control 258b, a refine control 258c, and an export control 258d. Although FIG. 2A illustrates the user interface 250 including the plurality of controls 258a-d associated with performing various functions, as described below, the user interface 250 can include one or more other controls for performing additional operations. For instance, the user interface 250 can include a plurality of controls for performing operations for editing, cropping, manipulating, importing, combining, and/or otherwise modifying the audio track by interacting with the waveform 256.

In one or more embodiments, the playback control 258a causes the audio editing system to play the audio track. For example, the user can select the playback control 258a after opening (e.g., importing) the audio track into the audio editing system and view the waveform 256 in the user interface 250 to play the audio track from the beginning of the audio track. Moreover, the user can select the playback control 258a to cause the audio editing system to play a portion of the audio track that is less than the full audio track. Specifically, by interacting with the user interface 250, the user can select a portion of the audio track to begin and/or end playback at different times than the beginning and/or ending of the full audio track. Thus, the user interface 250 can provide flexibility in allowing the user to listen to a custom segment of the audio track.

As described in more detail below, the loop control 258b allows the user to instruct the audio editing system to automatically identify portions of the audio track from which to generate one or more audio loops. In particular, selecting the loop control 258b can cause the audio editing system to analyze the audio track to identify portions of the audio track that are suitable audio loop candidates, and then generate audio loops corresponding to one or more of the suitable audio loop candidates. Additionally, the audio editing system can cause the user interface 250 to display a visual indication of the generated audio loops, which provides a quick and easy way for the user to view, select, and play the generated audio loops.

Furthermore, the audio editing system can also provide controls for interacting with audio loops after the audio editing system has generated one or more audio loops. For instance, the user interface 250 also includes a refine control 258c that causes the audio editing system to refine a user-selected portion of the audio track into an audio loop, and an export control 258d that allows the audio editing system to export a selected audio loop. The functionality of the refine control 258c and the export control 258d are described in more detail below with respect to FIG. 3B. The user interface 250 can also include additional controls for interacting with the waveform 256 and/or the generated audio loops, such as performing additional edits to the waveform 256 and/or the generated audio loops.

Figure 2B:
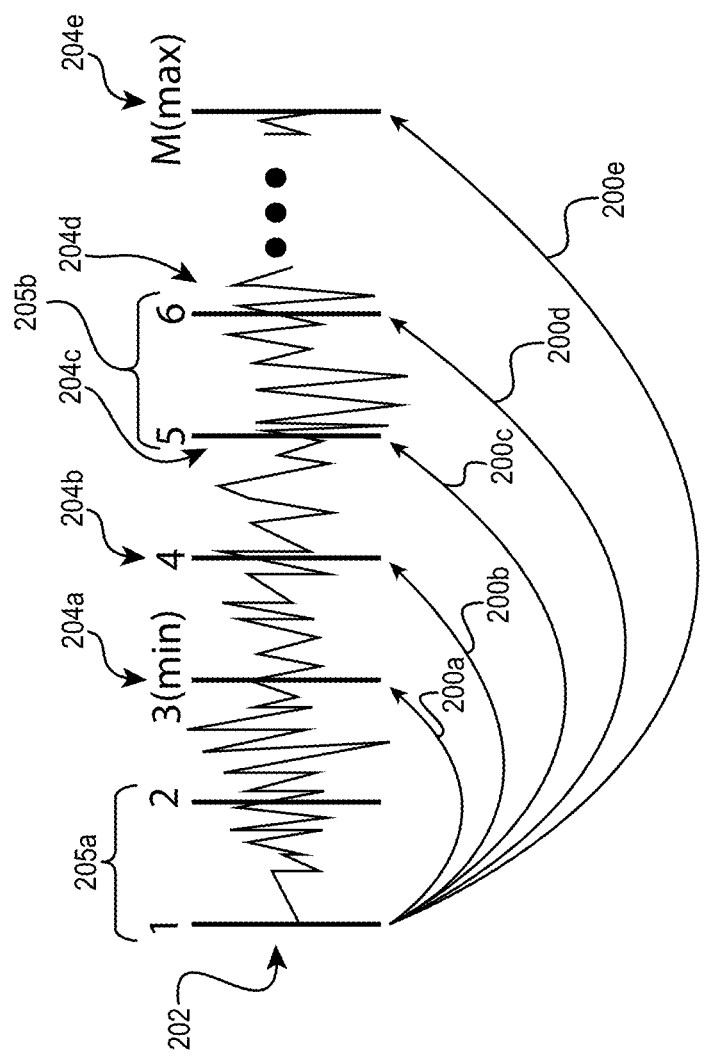
FIGS. 2B-2C illustrate example diagrams of an example audio analysis in an audio loop generation process in accordance with one or more embodiments.
Figure 2C:
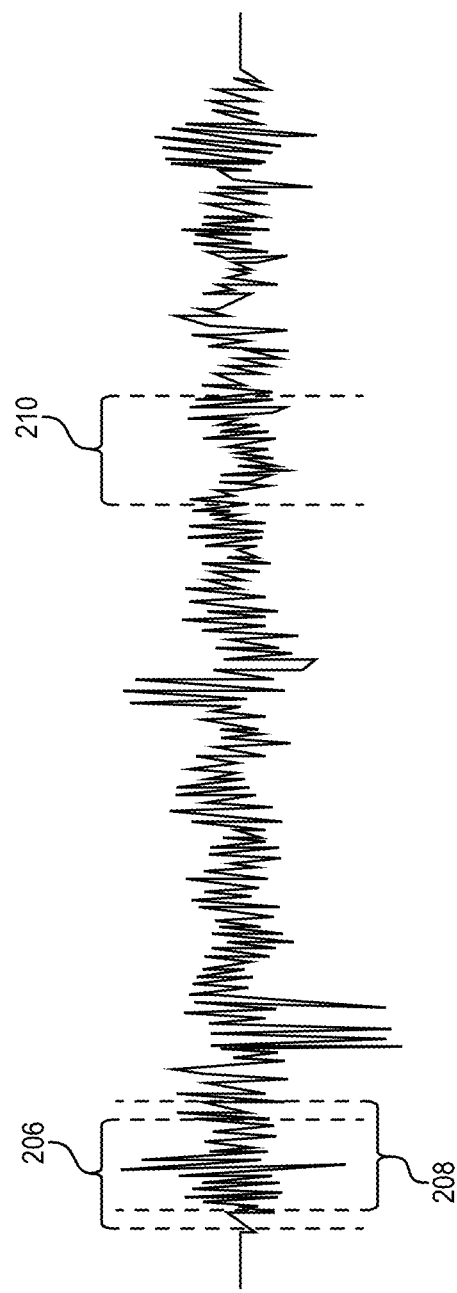

As described above, the user can select the loop control 258b to cause the audio editing system to generate one or more audio loops from the audio track. When generating audio loops from an audio track, the audio editing system analyzes the audio track to identify portions of the audio track that the system may use as a basis for generating audio loops. FIGS. 2B-2C illustrate a process for analyzing an audio track to generate audio loops. Specifically, FIG. 2B illustrates a diagram for determining whether a particular portion of the audio track is suitable for using as a basis for creating an audio loop. FIG. 2C illustrates a process for iterating through the audio track to identify a plurality of portions of the audio track that are suitable for generating one or more audio loops.

As illustrated in FIG. 2B, as part of identifying a portion of an audio track that is a suitable candidate for an audio loop, the audio editing system analyzes the audio track to identify one or more tempos within the audio track. As used herein, the term "tempo" refers to an identifiable pulse or rhythm within an audio track. Specifically, a tempo comprises multiple "beats" in an audio track corresponding to a pulse or rhythm. Accordingly, based on identifying the tempo, the audio editing system identifies beats within the audio track, for example, the beats represented by the vertical lines labeled 1, 2, 3, 4, 5, 6 . . . M, shown in FIG. 2B. Furthermore, the audio editing system can use the tempo to provide a pre-filtering mechanism to quickly eliminate candidate portions that do not have consistent tempos, as described in more detail with respect to FIG. 4A.

The audio editing system uses the identified beats to segment the audio track into various portions, where a portion is defined by a beginning beat and an ending beat. In particular, and as illustrated in FIG. 2B, the audio editing system identifies a plurality of portions 200a-e of the audio track, where each of the plurality of portions is defined with respect to a common beginning beat. For example, FIG. 2B illustrates that each portion of the plurality of portions 200a-e starts at a beginning beat 202, while each portion of the plurality of portions 200a-e ends at different ending beats 204a-e, respectively.

Each portion includes a region of the audio track from the beginning beat 202 (e.g., beat "1") to a corresponding ending beat (e.g., ending beats 204a-e). To illustrate, a first portion 200a includes the beginning beat 202, ending beat 204a, and the region of the audio track from the beginning beat 202 to the ending beat 204a. Similarly, a second portion 200b includes the beginning beat 202, ending beat 204b, and the region of the audio track from the beginning beat to the ending beat 204b. Additionally, the plurality of regions can include a third portion 200c, a fourth region 200d, and an nth region 200e, each region starting from the beginning beat 202 to a corresponding ending beat (ending beat 204c, ending beat 204d, and ending beat 204e, respectively).

In one or more embodiments, the plurality of portions are determined based on minimum and maximum beat constraints that determine how many beats each region may have, which can limit the amount of processing time associated with identifying suitable candidate portions for creating audio loops. In particular, the minimum and maximum constraints can indicate to the audio editing system that a portion has to include at least a minimum number of beats and no more than a maximum number of beats. As illustrated in FIG. 2B, the minimum constraint corresponds to beat "3" (ending beat 204a) indicating that any resulting region will be at least three beats in length. Similarly, the maximum constraint corresponds to beat "M" (ending beat 204e) indicating that any resulting region will not be longer than M beats in length.

Furthermore, the minimum and maximum beat constraints can be user defined (i.e., a user can manually input the minimum and maximum beat constraint as a user-defined preference). Alternatively, the minimum and maximum beat constraints are system defined based on default preferences or based on capabilities of a computing device (e.g., processing power). Moreover, in one or more embodiments, the audio editing system can determine the minimum and maximum beat constraints based on a determined tempo (e.g., a faster tempo corresponds with a higher minimum and maximum number of beats, while a slower tempo corresponds with a lower minimum and maximum number of beats).

Alternatively, or in addition, the audio editing system may use minimum and maximum time constraints that indicate a minimum and maximum length of time of an audio loop. When using time-based constraints, the audio editing system can identify beats that fall within the minimum and maximum time constraints. For example, the audio editing system can identify a first beat as a beginning beat for a portion, and then identify an ending beat as the next beat that occurs after the minimum time constraint. Similarly, the audio editing system can identify each beat between the minimum time constraint and the maximum time constraint, such that the largest audio portion from a particular beginning beat is defined by the last beat that occurs before the maximum time constraint.

In one or more alternative embodiments, the audio editing system does not use minimum and/or maximum beat or time constraints. For example, the audio editing system may process every possible portion of the audio track, including an entire audio track, to identify any suitable candidate portions for creating an audio loop.

After identifying the plurality of portions 200a-200e, the audio editing system analyzes the portions 200a-200e to determine a suitability of each portion for use in generating an audio loop. For example, the audio editing system analyzes a given portion by comparing the similarity of the first beat and the last beat of the given portion. To illustrate, the audio editing system analyzes the first portion 200a to determine whether an audio profile of the beginning beat 202 and an audio profile of the ending beat 204a are similar.

Based on the similarity of the audio features of the beginning beat 202 and the ending beat 204a, the audio editing system assigns a score to the first portion 200a, where the score represents the suitability of the first portion 200a to create an audio loop. For instance, the audio editing system assigns a score based on a difference between numerical values representing the audio features of the beginning beat 202 and the ending beat 204a. To illustrate, a highest score indicates that the difference between the beginning beat 202 and the ending beat 204a is the least, and a lowest score indicates that the difference between the beginning beat 202 and the ending beat 204a is the greatest. Accordingly, the audio editing system can determine that portions with higher scores have less distance between audio features of the beginning and ending beats than portions with lower scores.

The audio editing system then performs the above analysis, described above with reference to the first portion 200a, for the other portions having the common beginning beat 202. In particular, the audio editing system analyzes portions 200b-e by comparing the audio profile of the beginning beat 202 and the audio profile of the ending beat 204b-204e for each respective portion. The audio editing system can thus assign a score to each of the plurality of portions 200a-e that represents the suitability of each of the portions 200a-e to create an audio loop.

As mentioned, the audio editing system uses the scores assigned to the plurality of portions 200a-e to determine whether one or more of the portions is suitable for generating an audio loop. For instance, the audio editing system can compare the score for each portion to a predetermined threshold to determine whether each portion is suitable. If the score of a particular portion meets or exceeds the predetermined threshold, the audio editing system can determine that the portion is suitable. Alternatively, if the score does not meet the predetermined threshold, the audio editing system can determine that the portion is not suitable. Accordingly, the audio editing system can determine which, if any, of the plurality of portions 200a-e is suitable for creating an audio loop based on the predetermined threshold.

In one or more embodiments, the audio editing system determines the predetermined threshold for creating audio loops that are seamless. In particular, the audio editing system can use a predetermined threshold that is based on a standard set of audio features that typically affect how seamless an audio loop sounds. To determine such a threshold, the audio editing system can use a threshold set by a plurality of audio experts. For example, the audio experts can provide feedback for automatically generated audio loops, and the audio editing system can use the feedback to set or adjust the predetermined threshold. Alternatively, the audio editing system can analyze heuristics associated with previously generated audio loops to determine the predetermined threshold. Furthermore, the audio editing system can update the predetermined threshold based on additional information provided to the audio editing system (e.g., from audio experts and/or heuristics) to continuously improve the quality of generated audio loops.

Additionally, the audio editing system can select a highest scored portion from the plurality of portions 200a-e for generating an audio loop. Specifically, the audio editing system may determine that more than one portion is suitable for generating an audio loop based on meeting a particular threshold. According to one or more embodiments, the audio editing system then ranks the scores of the portions determined to be suitable for generating an audio loop and selects the portion with the highest score (e.g., highest rank). Selecting the portion with the highest score allows the audio editing system to generate a single audio loop using the portion from the plurality of portions 200a-e that is most suitable for generating an audio loop. Alternatively, the audio editing system can select more than one portion from the plurality of portions 200a-e that start at the beginning beat 202 for generating audio loops based on more than one corresponding scores meeting the predetermined threshold.

In one or more embodiments, the audio editing system can also compare a segment of a plurality of beats within a portion to another segment of a plurality of beats within the portion as part of the process of identifying suitable candidate portions for use in creating audio loops. For example, the audio editing system can verify that a beginning segment and an ending segment of a given portion are not repeats of one another (e.g., are not the same or substantially similar). Indeed, a beginning segment that appears to repeat an ending segment of a portion can cause a noticeable and/or awkward transition when playing an audio loop.

To illustrate, for portion 200d, the audio editing system can compare a first segment 205a at the beginning of the portion 200d to a second segment 205b at the end of the portion 200d. If the segments 205a-b are similar, the audio editing system can exclude the second segment 205b from the portion. Additionally, the audio editing system can verify that the resulting portion is suitable for an audio loop. In this case, removing the second segment 205b from portion 200d results in a portion that is the same as portion 200b. If the removal of a segment (e.g., segment 205b) from a portion results in a portion that is the same as another identified portion, the audio editing system can remove the original portion (e.g., portion 200d) as a candidate and select a new portion for generating an audio loop based on the corresponding scores. Otherwise, the audio editing system can use the reduced portion without the ending segment for generating the audio loop.

As described above with respect to FIG. 2B, the audio editing system analyzes a plurality of portions of an audio track that all share the same beginning beat 202 and have different ending beats 204a-e. In one or more embodiments, the audio editing system analyzes all of the portions of the audio track or of a selected region of the audio track that fits within the specified minimum/maximum constraints (e.g., the three beats to M(max) beats illustrated in FIG. 2B) to determine whether an audio track, or a user-selected region of the audio track, includes any suitable portions. FIG. 2C illustrates that the audio editing system iteratively analyzes the entire audio track of FIG. 2A to identify one or more suitable portions for generating one or more audio loops according to the specified constraints.

In one or more embodiments, the audio editing system performs an iterative analysis that steps through the entire audio track to identify suitable candidate portions of the audio track for creating an audio loop. Specifically, FIG. 2C illustrates that the audio editing system begins at a first region 206 of the audio track. For example, as illustrated, the first region 206 begins at a first beat of the audio track. Furthermore, the first region 206 covers a plurality of portions of the audio track that fit within the specified minimum and maximum constraints, as in FIG. 2B. Thus, the first region 206 includes a plurality of portions that begin at the first beat of the audio track and extend up to the maximum number of beats including the first beat of the audio track. The audio editing system analyzes the first region 206 to determine whether any of the portions in the first region 206 are suitable for generating audio loops (as described with respect to FIG. 2B).

After analyzing the first region 206, the audio editing system shifts to a second region 208 of the audio track. In particular, the second region 208 includes portions of the audio track that begin at a second beat of the audio track and end at different beats that fit within the specified minimum and maximum constraints. The second region 208 thus covers a plurality of portions that begin at the second beat of the audio track and extend up to the minimum and maximum number of beats specified. The audio editing system analyzes the second region 208 to determine whether any of the portions within the second region 208 are suitable for generating audio loops.

The audio editing system continues analyzing regions of the audio track to determine whether each region contains any portions that are suitable for audio loops. For example, FIG. 2C illustrates that the audio editing system continues by analyzing an nth region 210 that begins at beat N of the audio track, where N is any beat in the audio track, until the audio editing system reaches the end of the audio track. The audio editing system analyzes each successive region in the audio track until the audio editing system has analyzed (e.g., scored) all of the portions of the audio track to identify portions within the audio track that are suitable candidates for creating an audio loop.

Based on identifying one or more suitable candidate portions, in one or more embodiments, the audio editing system then generates one or more audio loops based on the identified portions of the audio track. In particular, the audio editing system can automatically, and without further user input, process an identified portion to create a transition from the ending beat of the portion to the beginning beat of the portion. By creating the transition, the audio editing system can generate a high-quality audio loop that includes a smooth transition from the end of the audio loop to the beginning of the audio loop when the audio loop is played in a continuous repeating manner. Additional detail regarding creating a transition for an audio loop based on an identified portion of an audio track will be discussed further below with respect to FIGS. 4A-4D.

Figure 3A:
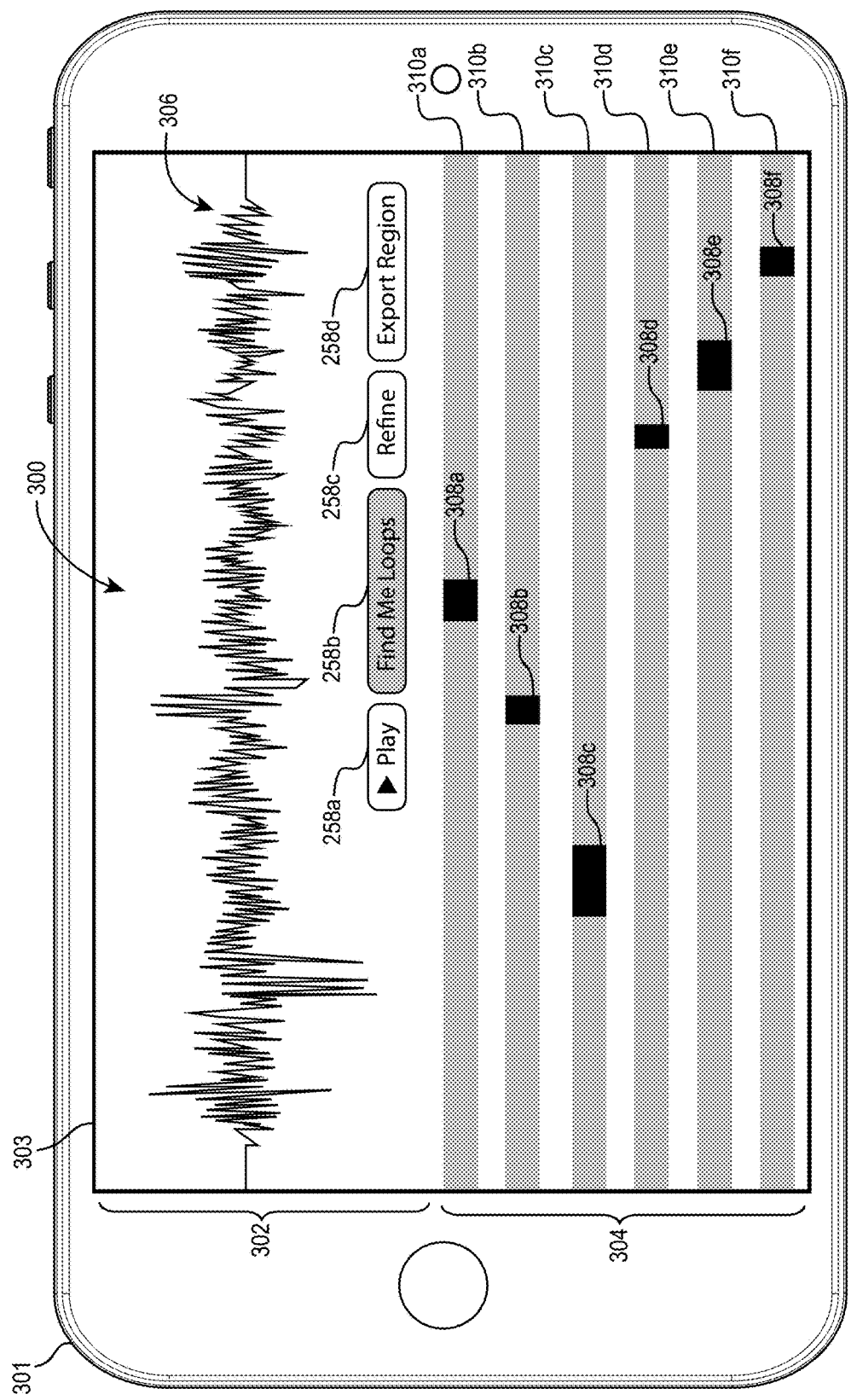
FIGS. 3A-3B illustrate additional example user interfaces of an audio editing system for generating audio loops from an audio track in accordance with one or more embodiments.
Figure 3B:
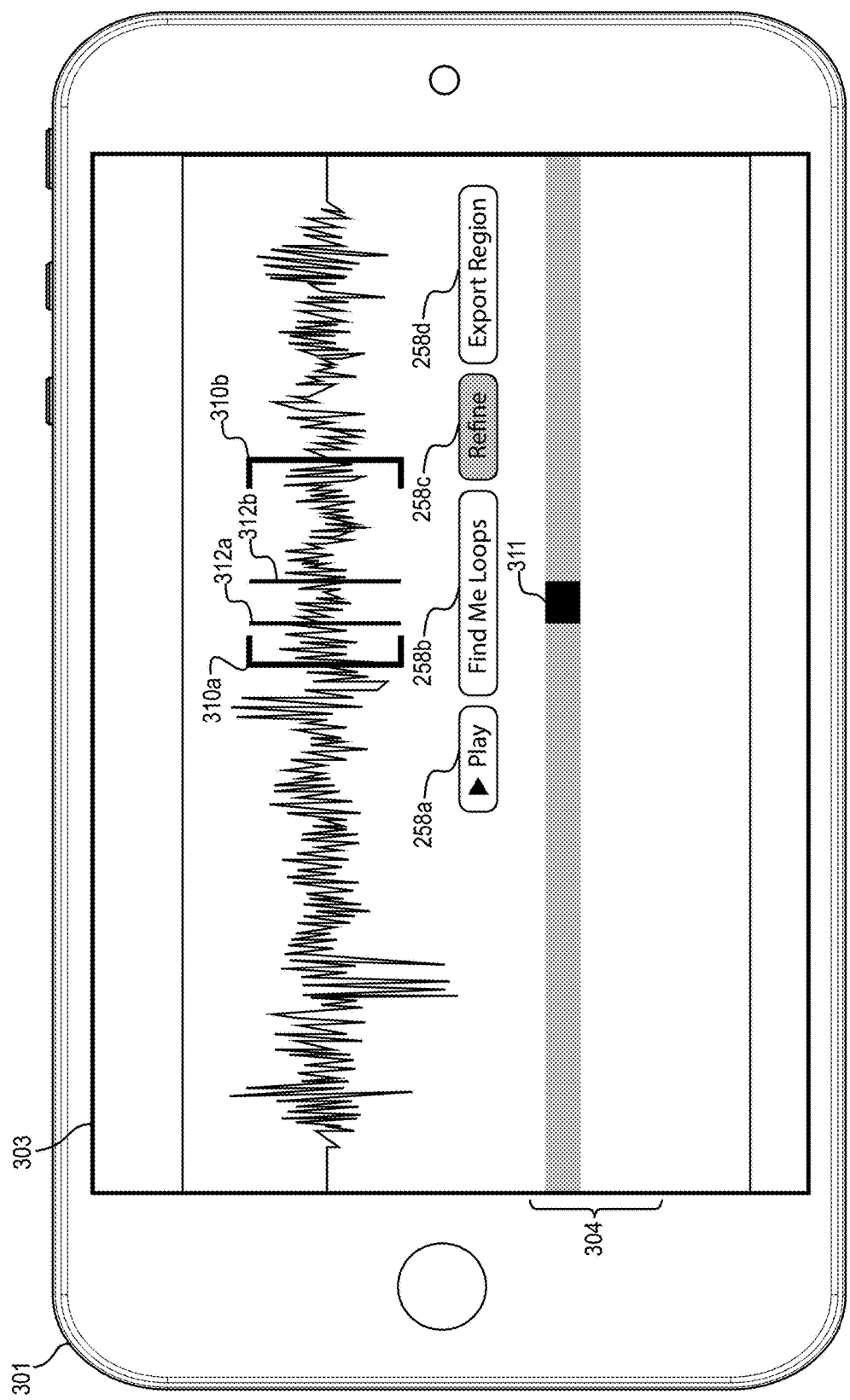

FIGS. 3A-3B illustrate example embodiments of user interfaces provided by the audio editing system that include a plurality of audio loops that the audio editing system generated based on the analysis of the audio track of FIGS. 2A-2C. FIG. 3A illustrates a plurality of audio loops that the audio editing system automatically generated for the entire audio track. FIG. 3B illustrates a plurality of audio loops that the audio editing system automatically generated for a manually selected portion of the audio track. Specifically, FIGS. 3A-3B shows example user interfaces that audio editing system provides in response to a user selection of the loop control 256b.

As illustrated in FIG. 3A, the audio editing system provides a user interface 300 on a display device 303 of a client device 301 with a waveform area 302 and a loop area 304. In particular, the waveform area 302 includes a waveform 306 of an audio track (e.g., the waveform 256 of FIG. 2A). The loop area 304 includes a plurality of audio loops 308a-f that the audio editing system generated from the audio track. Although FIG. 3A illustrates the audio editing system generating a plurality of audio loops 308a-f, the audio editing system may determine that an audio track does not have any suitable portions for generating audio loops. In such a case, the audio editing software returns a notification indicating that the audio editing system was unable to identify a suitable portion of the audio track to generate an audio loop.

According to one or more embodiments, the audio editing system provides the waveform area 302 for display in one region of the user interface 300 and the loop area 304 in another region of the user interface 300. For example, the audio editing system can provide the loop area 304 for display below the waveform area 302 in response to generating the audio loops 308a-f. To illustrate, the application displays the audio loops 308a-f in visually separate tracks 310a-f that allow the user to easily distinguish the audio loops 308a-f from one another. Displaying the audio loops 308a-f in separate lines or regions can be especially useful if one or more of the audio loops 308a-f overlap in the waveform 306. In another instance, the audio editing system enlarges or expands an overlapping audio loop when the user selects the audio loop to make the audio loop distinguishable from the other overlapping audio loop(s).

Additionally, the loop area 304 can display the audio loops 308a-f according to a ranking of the audio loops 308a-f. For instance, the audio editing system can rank the audio loops 308a-f based on the scores determined for the portions that the system used to generate the audio loops 308a-f. The audio editing system can then display the audio loops 308a-f in an order based on the rankings. For example, the audio editing system can display the highest ranked audio loop at the top of the loop area 304 and lower ranked audio loops below the highest in descending order.

In one or more embodiments, the loop area 304 is navigable. For instance, if the audio editing system generates more audio loops than can be displayed within the user interface 300, the audio editing system may adjust the loop area 304. To illustrate, the audio editing system can provide a scroll bar, tabs, or other navigation mechanism that allows the user to view the generated audio loops even if the audio loops do not all fit within the user interface 300. The audio editing system may also adjust the loop area 304 by modifying a display size associated with the audio loops 308a-f, tracks 310a-f, or other features of the application displayed within the user interface 300.

Alternatively, the audio editing system can display the waveform area 302 and the loop area 304 in separate windows or application interfaces. In yet other examples, the audio editing system can overlay the audio loops 308a-f on top of the waveform 306, such that a user may easily be able to determine to which portion of the audio track an audio loop corresponds. The audio editing system can also provide selectable options within the user interface 300 that allow the user to change how/where the audio loops 308a-f are displayed within the user interface 300.

In one or more embodiments, the audio editing system also includes an option to provide a visual indicator on the waveform 306 to indicate a corresponding audio loop. For example, after generating an audio loop, the audio editing system can assign an identifier to the audio loop (e.g., a number or letter). The audio editing system can map the identifier of the audio loop to the corresponding location of the waveform 306. To illustrate, the identifier can be a number value, an alphanumeric value, a visual identifier (e.g., a color or shape), or any other identifier. The user can also customize the identifier by selecting an option to change the specific identifier or the type of the identifier. For instance, the user can change a name identifier or number identifier associated with the corresponding loop to allow the user to more easily locate/recognize the audio loop.

As mentioned briefly, the audio editing system can identify the highest scoring portion from a region as the most suitable portion for generating an audio loop. The audio editing system can then generate an audio loop for each portion that ranked highest within each given region and that also meets the predetermined threshold. The audio editing system displays the resulting audio loop for each given region within the user interface 300, such as in each of the plurality of tracks 310a-f in FIG. 3A. Specifically, if the highest scoring portion of a region does not meet the predetermined threshold, the audio editing system may not generate any audio loops for that region. Thus, the audio editing system may not generate any audio loops for a region that does not have portions that make suitable audio loops based on the audio profiles of the beats in that region.

In one or more embodiments, the audio editing system allows the user to interact with the generated audio loops 308a-f by selecting the audio loops and one or more controls in the user interface 300. Specifically, the user interface 300 can display a plurality of controls 258a-d, as illustrated in FIG. 3A, to interact with the audio loops 308a-f. For example, the user can select an audio loop and then select the playback control 258a to play only the selected audio loop. In particular, selecting the playback control 258a causes the application to play the selected audio loop with the transition between the end of the audio loop to the beginning of the audio loop, rather than the corresponding portion of the audio track. Additionally, the user interface 300 can include a playback indication showing that the audio editing system is playing the selected audio loop in the corresponding portion of the waveform 306 (e.g., using a visual playback indicator that follows the waveform 306 during playback).

As illustrated in FIG. 3B, the user can select particular segments of an audio track from which the audio editing system identifies candidate portions to generate audio loops. In one or more embodiments, the audio editing system refines a user-selected portion of an audio track to create an audio loop. Specifically, a user can manually select a specific portion of the audio track from which to generate an audio loop. The audio editing system identifies the user-selected portion and determines the best audio loop from the selected portion. For instance, rather than analyzing an entire audio track for a plurality of possible audio loops, the audio editing system can analyze the selected portion for the best, single audio loop within the bounds of identified portion. Thus, the audio editing system can allow a user to find an audio loop that the audio editing system might not have provided to the user using the completely automatic audio generation process.

The audio editing system then generates the audio loop using the selected portion. In particular, the audio editing system generates the audio loop by modifying the selected portion to create a smooth transition from the ending of the portion to the beginning of the portion. For instance, the audio editing system can apply one or more processes or filters to create a transition from the end of the portion to the beginning of the portion to allow for continuous and seamless playback of the portion. The audio editing system can then present the audio loop in a graphical user interface, by which a user can play and/or export the audio loop for use in another project.

In particular, the user can provide one or more manually selected boundaries 310a-b on the waveform 306 to set a beginning time or ending time of the audio track from which to generate an audio loop. The audio editing system can detect the manually selected boundaries 310a-b and identify the region between the boundaries 310a-b to begin the audio loop generation process. For example, selecting the refine control 258c after a user manually selects the boundaries 310a-b causes the audio editing system audio editing system to perform the audio loop generation process on the user-specified segment of the audio track and to find a single, best audio loop for the user-specified segment.

This can be useful if the user has a preferred region of a particular audio track from which the user wants to create an audio loop, rather than requiring the audio editing system to analyze the entire audio track, which may take additional computing time, depending on the length/attributes of the audio track, processing capabilities of the user's client device, or the number of suitable audio loops. Furthermore, manually select a region for generating a single audio loop can cause the audio editing system to generate and audio loop that the audio editing system may not have provided to the user during a fully automated audio loop generation process. To illustrate, a user may use the refine control 258c at any time to cause the audio editing system to generate a new audio loop within user-defined boundaries.

In one or more alternative embodiments, a user causes the audio editing system to refine a manually selected region of the audio track by selecting the refine control 258c. For instance, the audio editing system can generate an audio loop 311 in response to the user selecting the refine control 258c. As also illustrated in FIG. 3B, the user can set one or both boundaries for finding the audio loop 311 by dragging a boundary within the waveform 306. After modifying a boundary within the waveform 306 (e.g., the beginning boundary 312a or end boundary 312b), the user can select the refine control 258c to cause the audio editing system to generate a new audio loop for the boundaries. If the user is not satisfied with the resulting audio loop, the user may adjust the beginning boundary 312a and/or end boundary 312b to create or refine a new audio loop within the new boundaries. Thus, the user can request new audio loops for any manually selected regions of the audio track at any time.

As indicated in FIG. 3B, the user interface 300 also includes an export control 258d for exporting a generated audio loop. Specifically, the export control 258d can export the selected audio loop 311 for the user to use in a new project. For example, when the user is satisfied with an audio loop, the user can select the export control 258d to export the selected audio loop 311. In one or more embodiments, the export control 258d exports the selected audio loop 311 to an audio file that is stored on the user's device. In one or more embodiments, the export control 258d opens a new project window within the application and pastes the selected audio control 311 into the new project window. Thus, the application provides flexibility to allow the user to use the selected audio loop 311 within the same application or a different application based on the user's needs.

FIGS. 4A-4D illustrate flowcharts of a method 400 of automatically generating audio loops from an audio track. In particular, the audio editing system accesses an audio track 401. For instance, the audio editing system accesses the audio track in response to receiving a request to import the audio track from a digital audio file from a specified storage location. The audio editing system can access the digital audio file from a local storage on a user's client device, from a cloud-based storage on one or more servers associated with the audio editing system, or from a storage system that is separate from the audio editing system.

Additionally, the method 400 includes a step 402 for automatically identifying portions of the audio track. As described above with respect to FIGS. 2B-2C, for example, the audio editing system can then automatically identify a plurality of portions of an audio track, wherein each portion of the plurality of portions is a possible audio loop comprising a different number of beats starting at a beginning beat. The audio editing system can identify a plurality of portions by analyzing the entirety of an audio track. Alternatively, the audio editing system identify a plurality of portions of from a user-selected subportion of an audio track. For example, the selected subportion can correspond to a manually selected region of the audio track.

To identify portions of an audio track, the audio editing system can also identify a plurality of beats of the audio track. To illustrate, the audio editing system can use a beat extraction algorithm to identify the plurality of beats of the audio track. For example, the audio editing system can identify the plurality of beats of the entirety of the audio track.

Additionally, the audio editing system can estimate a tempo of the audio track. For example, the audio editing system can use a tempo estimation algorithm that estimates the tempo of the audio track based on identified beats. The audio editing system can use the tempo of the audio track in a pre-filtering technique to determine whether one or more portions will be suitable loops prior to scoring the portions. For instance, the audio editing system can analyze the tempo of a portion of the audio track to determine whether the tempo is consistent from the beginning of the portion to the end of the portion. If the tempo is substantially different between the beginning and ending beats of the portion, the audio editing system removes the portion as a candidate without analyzing any other audio features of the beats within the portion.

Figure 4A:
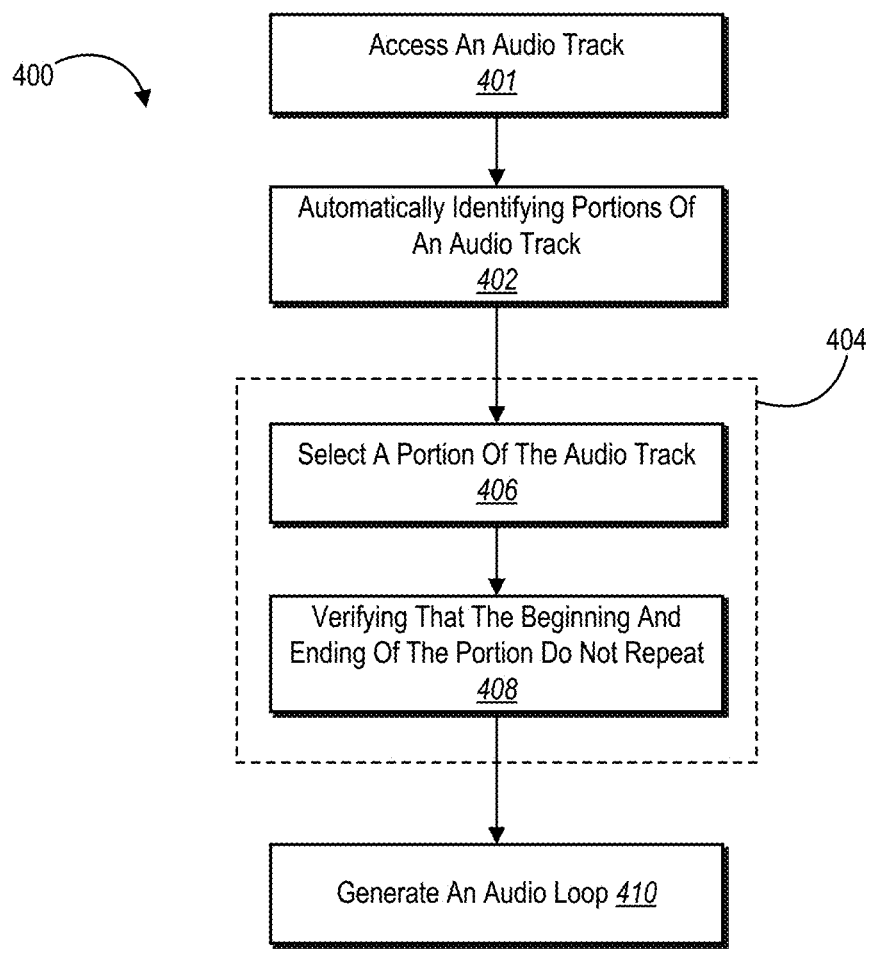
FIGS. 4A-4D illustrate flowcharts of example methods of generating audio loops in accordance with one or more embodiments.
Figure 4B:
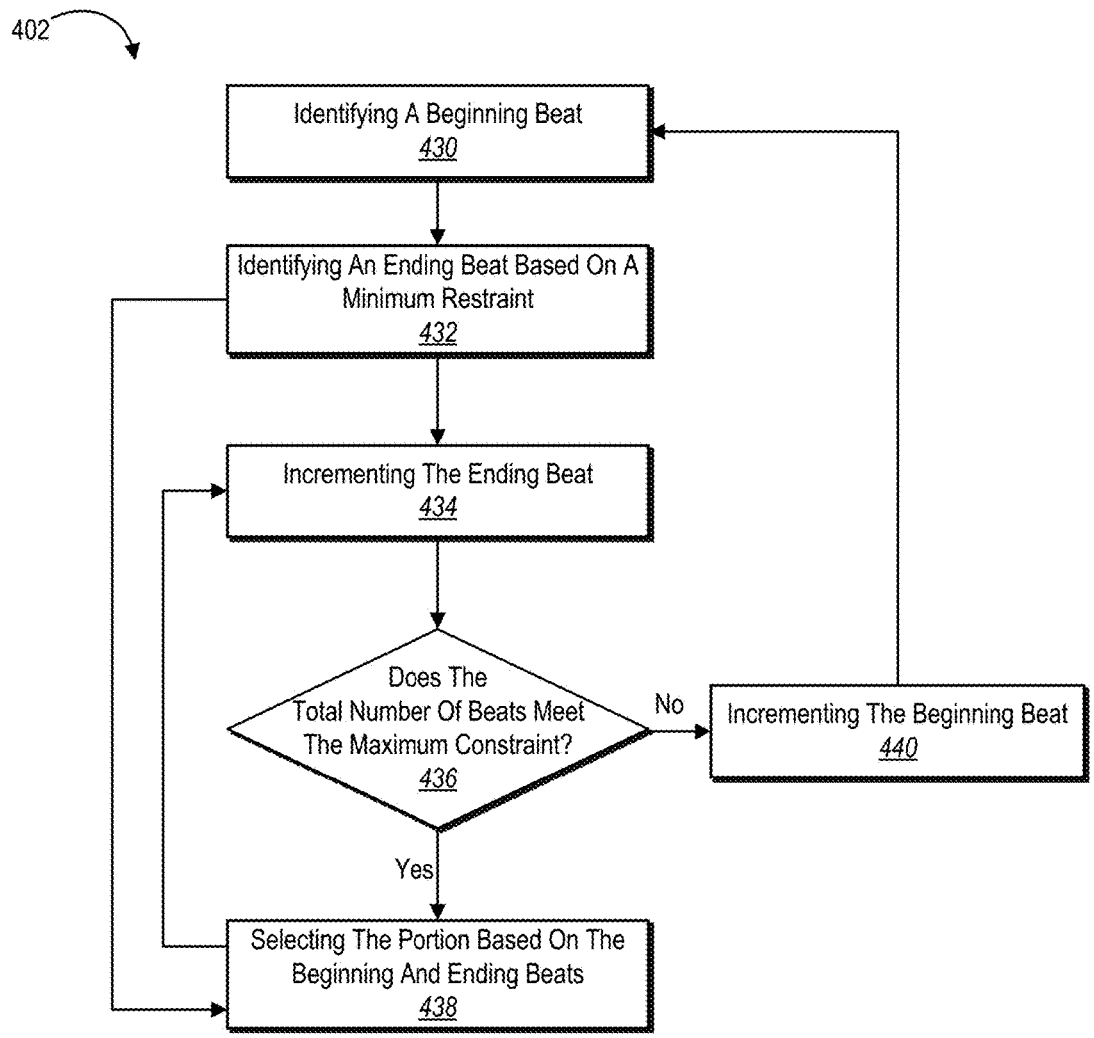

FIG. 4B illustrates a flowchart of a series of acts associated with the step 402 for automatically identifying portions of the audio track. As illustrated, the step 402 for automatically identifying portions of the audio track includes processes described above with respect to FIGS. 2B-2C. Specifically, identifying portions of the audio track includes first identifying a beginning beat 430 for a candidate portion. For example, the audio editing system identifies a first beginning beat of an audio track for comparing a plurality of possible portions that meet minimum and maximum constraints for generating audio loops.

After identifying a beginning beat, the audio editing system identifies an ending beat based on a minimum constraint 432. For instance, as described above with respect to FIG. 2B, the audio editing system determines that the ending beat corresponds to a portion that meets the minimum constraint. After identifying the ending beat, the audio editing system selects the portion based on the beginning and ending beats 438 and proceeds to a step 404 for selecting the portion and verifying that the portion does not include repeating segments, as described in relation to FIGS. 4C-4D.

After selecting the first portion, the audio editing system continues analyzing additional portions that share the same beginning beat while also meeting the minimum and maximum constraints. In particular, the audio editing system increments the ending beat 434 by finding the next beat after the previous ending beat. The audio editing system then checks the length of the portion with the new ending beat to determine whether the total number of beats meet the maximum constraint 436. If the portion meets the maximum constraint, the audio editing system selects the portion based on the beginning and ending beats 438 and then returns to incrementing the ending beat 434. If the portion does not meet the maximum constraint, the audio editing system increments the beginning beat 440 and then returns to the beginning of the step 402 by identifying the beginning beat 430 and proceeding to identify portions that meet the minimum and maximum constraints for the new beginning beat, as illustrated in FIG. 2C.

Figure 4C:
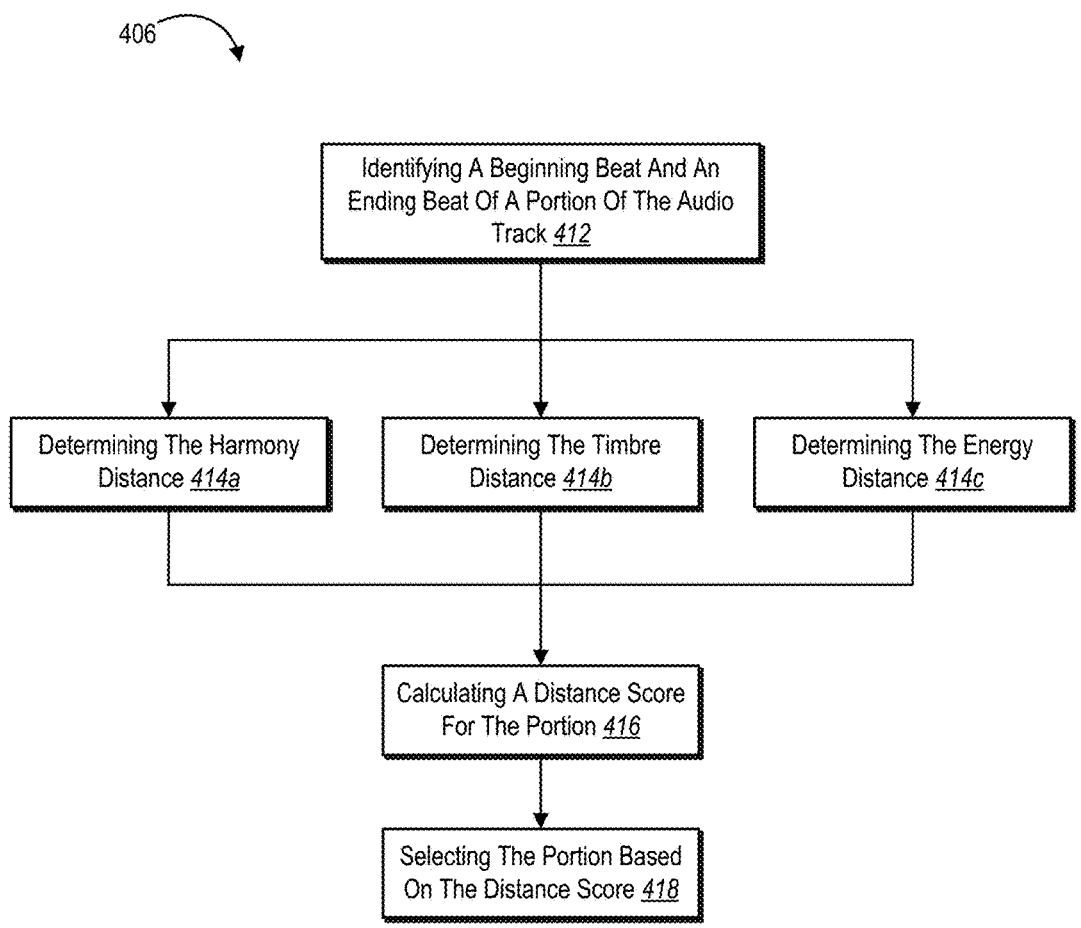
Figure 4D:
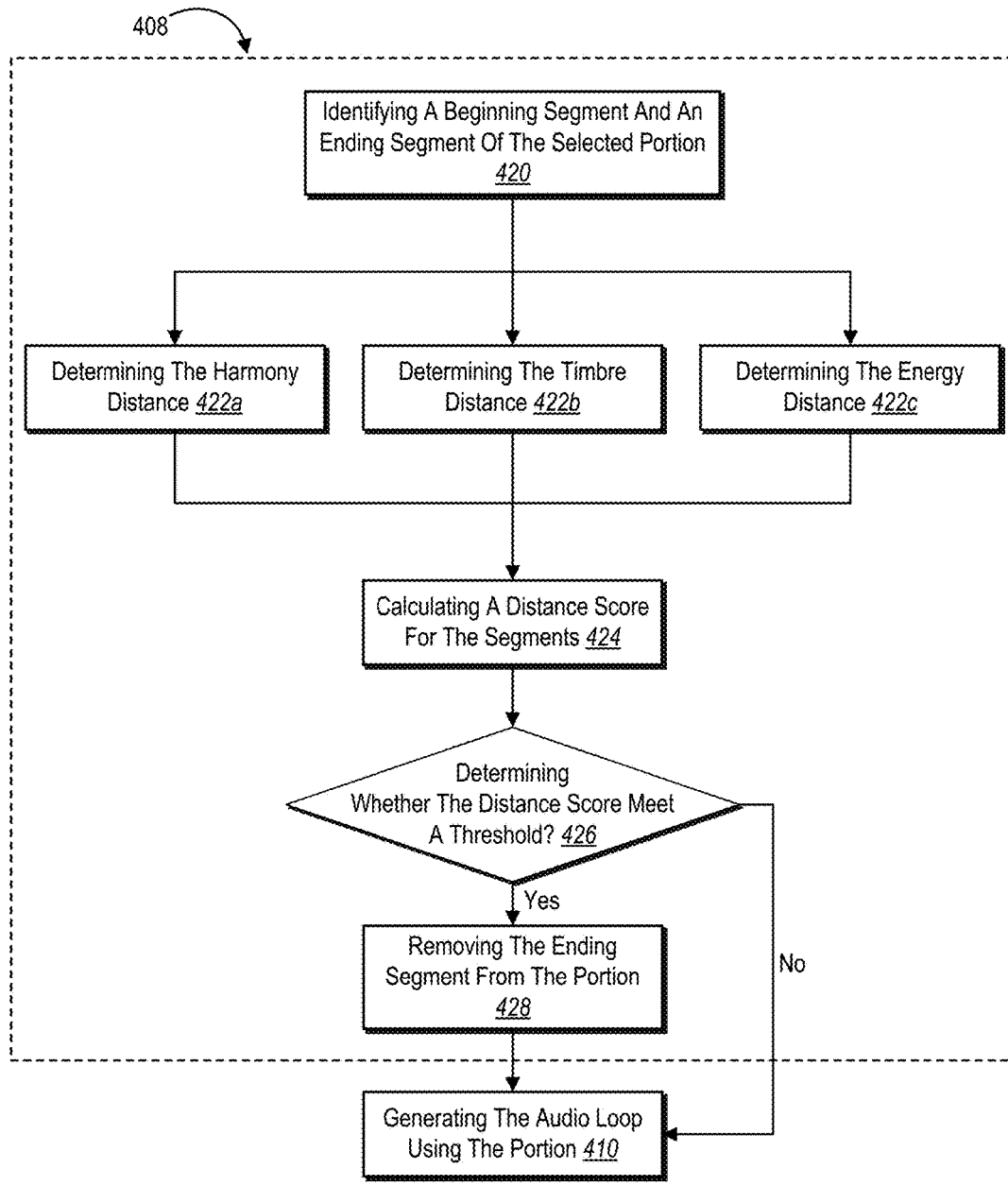

The method 400 includes a step 404 for selecting the portion and verifying that the portion does not include repeating segments. Specifically, step 404 includes a step 406 for selecting a portion of the audio track and a step 408 for verifying that the beginning and end of the portion do not repeat. FIG. 4C illustrates a flowchart of a series of acts associated with the step 406 for selecting the portion of the audio track. FIG. 4D illustrates a flowchart of a series of acts associated with the step 408 for verifying that the beginning and end of the portion do not repeat. Additionally, the audio editing system can generate an audio loop using the portion 410, as described in more detail below with respect to FIG. 4D.

As mentioned, FIG. 4C illustrates a flowchart of a series of acts associated with step 406 of FIG. 4A. Specifically, selecting a portion of the audio track identifying a beginning beat and an ending beat of a portion of the audio track 412. For example, the audio editing system can identify the beginning beat of the portion within the audio track and then identify the ending beat of the portion in relation to the beginning beat of the portion. The resulting portion includes the region of the audio track between, and including, the beginning beat and the ending beat.

After identifying the beginning beat and an ending beat of a portion of the audio track, the audio editing system determines audio profiles for the beginning beat and the ending beat. For example, the audio editing system determines a harmony or harmonic feature of the beginning beat and a harmony/harmonic feature of the ending beat. To illustrate, the harmony of the beginning beat and the harmony of the ending beat can include chroma vectors of the beginning beat and the ending beat. The audio editing system also determines a timbre of the beginning beat and a timbre of the ending beat. To illustrate, the timbre of the beginning beat and a timbre of the ending beat can include Mel-Frequency Cepstral Coefficients (MFCC) of the beginning beat and the ending beat. Furthermore, the audio editing system determines an energy of the beginning beat and an energy of the ending beat. To illustrate, the energy of the beginning beat and an energy of the ending beat can include a root mean square (RMS) energy of the beginning beat and the ending beat.

After the audio editing system has determined the plurality of audio features of the beginning beat and ending beat of the portion of the audio track, the audio editing system compares the audio features of the beginning beat and ending beat to determine a similarity of the beginning beat and the ending beat. In particular, the audio editing system analyzes the beats to determine a similarity of the audio features of the beats. For example, the audio editing system determines the harmony distance 414a between the beginning beat and the ending beat. To illustrate, the audio editing system determines the cosine distance between chroma vectors associated with the beginning beat and the ending beat. The audio editing system also determines the timbre distance 414b between the beginning beat and the ending beat. For instance, the audio editing system determines the Euclidean distance between MFCC vectors corresponding to the beginning beat and the ending beat. Additionally, the audio editing system determines the energy distance 414c between the beginning beat and the ending beat. To illustrate, the audio editing system determines the root mean square (RMS) energy difference for the beginning beat and the ending beat.

Although one or more embodiments of the audio editing system compare a beginning beat to an ending beat of a portion, the audio editing system can compare a first plurality of beats to a second plurality of beats. For example, the audio editing system can compare the audio features of a beat segment at or near the beginning of the portion to the audio features of a beat segment at or near the end of the portion, which can be especially useful if a single beat does not produce a meaningful comparison result. To illustrate, the audio editing system can compare the similarity of a beat segment including four beats at the beginning of the portion to the similarity of a beat segment including four beats at the end of the portion. In at least some embodiments, the audio editing system also includes one or more beats after the ending beat for use in the comparison. As described in more detail with reference to FIG. 4C, comparing groups of beats to each other can also be useful in refining a portion of an audio track before generating an audio loop.

After determining the audio feature distances of the beginning beat (or beat segments) to the audio feature distances of the ending beat (or beat segments), the step 406 for selecting a portion of the audio track also includes calculating a distance score for the portion 416. Specifically, the audio editing system combines the determined differences of the audio features of the compared beats or segments to generate a score for the portion. For example, the audio editing system determines the similarity of the audio features of individual beats using the algorithm below:

$$L(i,j) = \alpha D_c(C[i], C[j]) + \beta D_m(M[i], M[j]) + \theta D_r(R_i, R_j)$$

where i, j correspond to beat $b_i$ and $b_j$, respectively, $D_c$ denotes the cosine distance between two chroma vectors C[i] and C[j], $D_m$ denotes the Euclidean distance between two MFCC vectors M[i] and M[j], and $D_r$ denotes RMS energy difference. Additionally, $\alpha$, $\beta$, and $\theta$ represent weights applied to the separate distance calculations. A modified version of the above algorithm, described in reference to FIG. 4D, allows the audio editing system to compare segments containing a plurality of beats to each other.

In one or more embodiments, as above, the audio editing system computes the score as a combined sum of the distances between the audio features. Alternatively, the audio editing system can weight one or more of the audio features to give more or less importance to one or more of the audio features. For instance, the audio editing system can determine that larger differences in one or more of the audio features are correctable with one or more audio processing techniques. To illustrate, the audio editing system can determine that large distances in the energy are correctable by applying an energy correction algorithm to one or more beats when generating the audio loop. Accordingly, the audio editing system can give a lower weight to the energy when creating the distance score.

Alternatively, the audio editing system may use only one or two of the audio features described above. For instance, the audio editing system may use the harmony and timbre for calculating the distance score, but not the energy. In another example, the audio editing system may use the harmony and energy for calculating the distance score, but not the timbre. Thus, the audio editing system can use any combination of the above described audio features to calculate the distance score. The audio editing system can also use other audio features, such as rhythm, melody, frequency, and spatial location when comparing two or more beats and calculating a distance score.

Once the audio editing system has calculated the distance score for the portion, the audio editing system selects the portion based on the distance score 418. In particular, the audio editing system can compare the distance score for the portion to a predetermined threshold, as described previously with respect to FIG. 2B. For example, the audio editing system can compare the distance score of the portion, as a numeric value, to a predetermined threshold with a numeric value. If the distance score of the portion is at or below the predetermined threshold, indicating that the audio feature distance is not greater than the predetermined threshold, the audio editing system can indicate that the portion is suitable for generating an audio loop. Alternatively, the audio editing system may use the distance score to generate a confidence score such that a higher confidence score indicates a more suitable portion. In such a case, if the confidence score of the portion is at or above the predetermined threshold, the audio editing system can determine that the portion is suitable.

Additionally, the audio editing system can compare the distance score of the portion to the distance scores of one or more other portions of the audio track. To illustrate, the audio editing system can calculate distance scores for a plurality of portions that share the same beginning beat. The audio editing system can determine that the calculated distance score for a particular portion is better than the distance scores of the other portions and then select the particular portion as the most suitable portion that starts at the common beginning beat. Alternatively, the audio editing system can select all of the portions that have distance scores that meet the predetermined threshold and allow the user to select one or more portions for generating an audio loop.

After selecting a portion of the audio track, the audio editing system then refines the selected portion. Specifically, FIG. 4D illustrates a step 408 for optimizing a transition of the portion. As illustrate, the step 408 for optimizing the transition of the portion includes identifying a beginning segment and an ending segment of the selected portion 420.

For example, as described previously with respect to FIG. 2B, the audio editing system can verify that the portion does not include repeating segments at the beginning and end of the portion. To illustrate, the audio editing system can select a first segment that includes the beginning beat of the portion and at least one beat after the beginning beat. The audio editing also selects a second segment that includes the ending beat of the portion and at least one beat prior to the ending beat. The audio editing system selects the first segment and the second segment to include the same number of beats.

The audio editing system then identifies the audio features of the first segment and the second segment. For example, the audio editing system can determine the harmony, timbre, and energy of the first segment and the second segment based on the plurality of beats in each segment, as described previously in relation to determining audio features of the beginning beat and ending beat in FIG. 4C. In particular, the audio editing system can determine chroma vectors, MFCC vectors, and RMS energy for the first segment and the second segment.

Once the audio editing system has determined the audio features of the first segment and the second segment, the audio editing system can determine the distances between the corresponding audio features. Specifically, the audio editing system determines the harmony distance 422a between the first segment and the second segment. The audio editing system also determines the timbre distance 422b between the first segment and the second segment. Additionally, the audio editing system determines the energy distance 422c between the first segment and the second segment.

Determining the distances between the audio features of the first segment and the second segment allows the audio system to calculate a distance score for the segments 424. In particular the audio editing system combines the determined differences of the audio features of the compared segments to generate a score for the portion. For example, the audio editing system determines the similarity of the audio features of a first segment including beat $b_i$ and a second segment including beat $b_j$, each of the first segment and second segment including n number of beats, using the formula below:

$$L(i, j) = \alpha \sum_{k=0}^{n-1} D_c(C[i+k], C[j+k]) +$$

$$\beta \sum_{k=0}^{n-1} D_m(M[i+k], M[j+k]) + \theta D_r(R_{i:i+(n-1)}, R_{j:j+(n-1)})$$

where L(i,j) returns a combined feature distance between corresponding beats in the first segment and the second segment.

To illustrate, for segments including four beats, the audio editing system determines audio feature differences between a first beat of each segment, the difference between a second beat of each segment, the difference between a third beat of each segment, and the difference between a fourth beat of each segment. That audio system then combines the audio feature differences for all of the beats in each segment and sums the resulting audio feature differences to calculate the difference score. As mentioned with respect to FIG. 4C, the audio editing system can alternatively compute the score as a weighted sum of the distances between the audio features.

For example, the audio editing system can weight one or more of the audio features to give more or less importance to one or more of the audio features.

After calculating the distance score between the first segment and the second segment, the audio editing system then determines whether the distance score meets a threshold 426. For example, the threshold can be the same threshold used to determine a suitability of the portion for generating an audio loop. Alternatively, the threshold can be a different threshold used specifically for determining whether the first segment and the second segment are the same or substantially similar.

The threshold allows the audio editing system to determine that the segments are similar enough for the audio editing system to modify the portion prior to creating an audio loop. In particular, if the audio editing system determines that the distance score does not meet the threshold (i.e., the segments are not substantially similar), the audio editing system does not remove the second segment and proceeds to generate the audio loop using the portion 410, as illustrated in FIG. 4D. Alternatively, if the audio editing system determines that the distance score meets the threshold (i.e., the segments are substantially similar), the audio editing system can determine that the second segment at the end of the portion would cause an audio loop generated from the portion to repeat when looping from the end to the beginning of the audio loop. Thus, the audio editing system removes the ending segment from the portion 428. For example, the audio editing system can remove all of the beats in the second segment from the portion to cause the portion to end after the beat prior to the second segment.

In one or more embodiments, if the audio editing system removes the second segment from the portion, the audio editing system also checks the resulting portion to determine whether the resulting portion is still suitable for generating an audio loop. For example, the audio editing system determines that the resulting portion has a new ending beat, and thus compares the new ending beat to the beginning beat of the portion. If the audio editing system determines that the resulting portion is not suitable for generating an audio loop, the audio editing system can discard the portion. If the audio editing system determines that the resulting portion is still suitable for generating an audio loop, the audio editing system generates the audio loop using the portion 410.

After determining whether the beginning segment and ending segment are similar, and removing the ending segment if they are similar, the audio editing system generates the audio loop using the portion 410. Specifically, the audio editing system automatically performs, without user input, one or more operations to create the audio loop. For example, the audio editing system can apply one or more filters or other audio processing techniques to the portion to create a seamless transition between the end and the beginning of the portion.

In one or more embodiments, the audio editing system applies a crossfade to lower an amplitude and/or other noise level of the tails (e.g., beginning and end) of the portion and overlap the crossfaded tails at a zero crossing point to create a full audio loop that has the same length as the original portion. For instance, a tail at the beginning of the portion can include part of the audio track immediately before the beginning beat, and a tail at the end of the portion can include part of the audio track immediately before the ending beat. Accordingly, applying a crossfade to the tails causes the audio loop to include a natural transition from the end of the audio loop to the beginning of the audio loop (e.g., space between beats based on the tempo and audio features of the beginning and ending beats). As such, the audio loop includes the beginning beat and intervening beats between the beginning beat and the ending beat, but excluding the ending beat.

In alternative embodiments, the audio editing system applies the crossfade such that the beginning beat and the ending beat overlap naturally. For example, the audio editing system can apply a crossfade with a zero crossing point at the beginning and ending beat to create a transition with a beat that sounds like both the beginning and ending beats. The audio editing system can thus create the transition from the ending beat to the beginning beat in a variety of ways depending on the corresponding audio features and/or characteristics of the resulting audio loop.

The audio editing system may apply other processing to the audio loop to create the seamless transition, such as by modifying an audio feature of the beginning beat and/or ending beat to more closely match the sound of the beats. For instance, if one of the beats is the same note but in a higher octave, the audio editing system may apply a filter to change the octave of the beat that is in the higher octave to a lower octave to match the other beat. In another example, the audio editing system can change a key of a beat in the portion. Thus, the audio editing system may perform simple modifications that can transform the portion to a seamless, repeatable audio loop.

FIGS. 1-4D, the corresponding text, and the examples, provide a number of different systems and devices for providing automatically generated audio loops from an audio track. In addition to the foregoing, embodiments can be described in terms of flowcharts comprising acts and steps in a method for accomplishing a particular result. For example, FIG. 5 illustrates a flowchart of an exemplary method in accordance with one or more embodiments.

Figure 5:
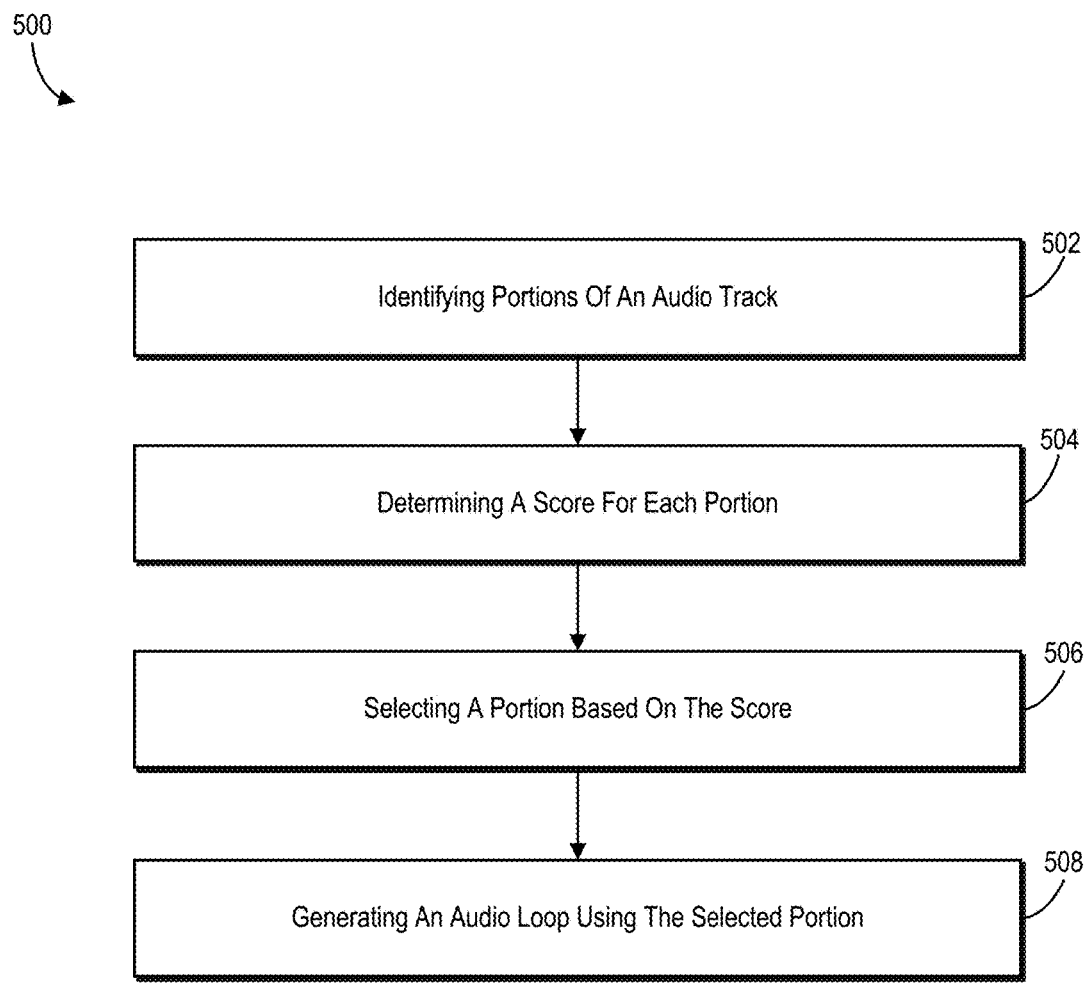
FIG. 5 illustrates a flowchart of a series of acts in a method of generating audio loops in accordance with one or more embodiments.

FIG. 5 illustrates a flowchart of a series of acts in a method 500 of generating audio loops. The method 500 includes an act 502 of identifying portions of an audio track. For example, act 502 involves identifying a plurality of portions of an audio track, wherein each portion of the plurality of portions is a possible audio loop comprising a different number of beats starting at a beginning beat. Act 502 can involve receiving a request to generate at least one audio loop from the audio track as a whole, and identifying the plurality of portions of the audio track in response to the received request. Alternatively, act 502 can involve identifying a user-selected portion of the audio track, wherein the user-selected portion is less than a whole of the audio track, receiving a request to generate an audio loop from the user-selected portion of the audio track, and wherein identifying the plurality of portions of the audio track comprises identifying the plurality of portions of the audio track within the user-selected portion in response to the received request.

Act 502 can involve identifying each portion of the audio track that starts at the beginning beat and meets one or more constraints. For example, act 502 can involve identifying the plurality of portions that start at the beginning beat and meet a minimum constraint and a maximum constraint. The minimum constraint and the maximum constraint can include a minimum and a maximum number of beats for an audio loop. Alternatively, the minimum constraint and the maximum constraint can include a minimum and maximum time length for an audio loop. As such, act 502 can also involve identifying closest ending beats that meet the minimum and maximum time length for use in identifying one or more portions.

The method 500 also includes an act 504 of determining a score for each portion. For example, act 504 involves determining a score for each portion of the plurality of portions of the audio track by determining a similarity of an audio profile of the beginning beat and an audio profile of the ending beat of each portion. Act 504 can involve determining a plurality of audio features of the beginning beat and a plurality of audio features of the ending beat of each portion of the plurality of portions. For example, act 504 can involve determining a feature distance between the plurality of audio features of the beginning beat and the plurality of audio features of the ending beat of each portion. To illustrate, the plurality of audio features of the beginning beat can include harmony features, timbre features, and energy features of the beginning beat, and the plurality of audio features of the ending beat of each portion can include harmony features, timbre features, and energy features of the ending beat of each portion.

The method 500 further includes an act 506 of selecting a portion based on the score. For example, act 506 involves selecting a portion of the audio track from the plurality of portions of the audio track based on the determined score for each portion. Act 506 can involve comparing scores of the plurality of portions to a predetermined threshold, and identifying one or more portions that meet the predetermined threshold as suitable for generating one or more audio loops. Additionally, act 506 can involve comparing the determined score for each portion of the plurality of portions to one or more other portions of the plurality of portions, and selecting the portion based on the selected portion having a highest determined score.

The method 500 can also include identifying, within the selected portion, a first segment and a second segment, determining that the first segment and the second segment comprise a shared characteristic, and generating, based on the first segment and the second segment comprising the shared characteristic, the audio loop to include the first segment of the selected portion and exclude the second segment of the selected portion. For example, the method 500 can include determining that a plurality of beats of the first segment are similar to a plurality of beats of the second segment based on at least one audio feature of the plurality of beats of the first segment and at least one audio feature of the plurality of beats of the second segment.

Additionally, the method includes an act 508 of generating an audio loop using the selected portion. For example, act 508 involves generating an audio loop using the selected portion of the audio track. Act 508 can involve generating a crossfade transition from an ending beat of the selected portion to the beginning beat of the selected portion by applying the crossfade transition to a tail of the audio track before the ending beat and a tail of the audio track before the beginning beat. Act 508 can alternatively involve generating a crossfade transition from an ending beat of the selected portion to the beginning beat of the selected portion by applying the crossfade transition to the beginning beat and the ending beat with a zero crossing point of the crossfade transition at the beginning beat and the ending beat.

Act 508 can involve generating, in response to a request to generate at least one audio loop from the audio track as a whole, a plurality of audio loops for the audio track, wherein each generated audio loop for the audio track starts at a different beginning beat in the audio track. Act 508 can also involve generating at least two audio loops that overlap within the audio track.

The method 500 can also include providing, within a graphical user interface, a waveform representation of the audio track. Additionally, the method 500 can include providing, within the graphical user interface, an indication of the generated audio loop within the audio track. For example, the method 500 can include highlighting, in response to generating the audio loop and within the waveform representation of the audio track, the selected portion of the audio track corresponding to the audio loop from the beginning beat to an ending beat of the selected portion, providing, within the graphical user interface, a selectable option to play the generated audio loop, and playing the generated audio loop in response to a selection of the selectable option.

The method 500 can also provide one or more selectable options within the graphical user interface to allow the user to modify boundaries of an audio loop. For example, the method 500 can include receiving request to re-generate an audio loop in connection with a manual modification of a boundary of the audio loop, and generating a new audio loop based on the manual modification of the boundary loop. For instance, the method 500 can include identifying a new beginning beat or a new ending beat based on the manual modification of the boundary of the audio loop, and generating the new audio loop to include a transition involving the new beginning beat or the new ending beat.

Figure 6:
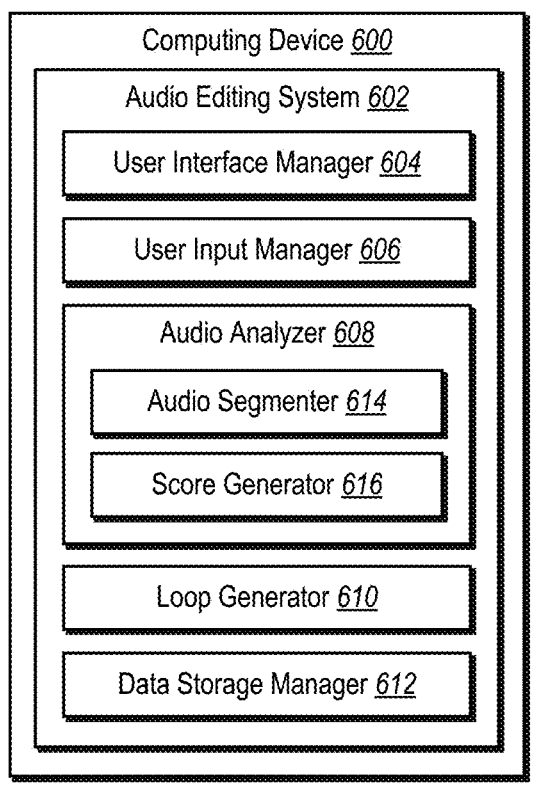
FIG. 6 illustrates a schematic diagram of an audio editing system in accordance with one or more embodiments.

Turning now to FIG. 6, FIG. 6 illustrates a schematic diagram illustrating a client device 600 that includes an audio editing system 602. As illustrated by FIG. 6, the client device 600 includes a plurality of components that perform at least some of the functions and methods described herein. The client device 600 can include a personal computer, laptop computer, mobile device, mobile phone, tablet, special purpose computer, television, or other computing device, including computing devices described below with regard to FIG. 7. Additionally, although FIG. 6 illustrates that the audio editing system 602 is operating on a single client device 600, the audio editing system may operate within a distributed environment, such that the audio editing system can be stored and/or operate on a plurality of computing devices. Furthermore, one or more client devices may remotely access the audio editing system to perform the audio loop generation processes.

As illustrated in FIG. 6, the audio editing system 602 allows the client device 600 to analyze audio tracks and generate one or more audio loops from the audio tracks. In one or more embodiments, the audio editing system 602 is associated with an application that runs on the client device 600 to perform the operations of audio loop generation. In particular, the audio editing system 602 includes a user interface manager 604, a user input manager 606, an audio analyzer 608, a loop generator 610, and a data storage manager 612. Although the components of the audio editing system 602 are shown to be separate in FIG. 6, any of the components may be combined into fewer components, such as into a single component, or divided into more components as may serve a particular implementation. Furthermore, at least some of the components of the audio editing system 602 may be implemented on other devices and/or with other systems.

The components of the audio editing system 602 can include software, hardware, or both. For example, the components of the audio editing system 602 (e.g., the components of the client device 600) can include on or more instructions stored on a computer-readable storage medium and executed by processors of one or more computing devices such as the client device 600. When executed by the one or more processors, the computer-executable instructions of the audio editing system 602 cause the computing devices to perform the audio loop generation processes described herein. Alternatively, the components of the audio editing system 602 comprise hardware, such as a special purpose processing device to perform specific functions associated with audio loop generation processes. Additionally, the components of the audio editing system 602 can comprise a combination of computer-executable instructions and hardware.

Furthermore, the components of the audio editing system 602 performing the functions described herein with respect to the audio editing system 602 may, for example, be implemented as part of a stand-alone application, as a module of an application, as part of a suite of applications, as a plug-in for applications including content creation applications, as a library function or functions that may be called by other applications, and/or as a cloud-computing model. Thus, the components of the audio editing system 602 may be implemented as part of a stand-alone application on a personal computing device or a mobile device. Alternatively or additionally, the components of the audio editing system 602 may be implemented in any application that allows delivery of content to users, as previously described with respect to FIG. 1.

As previously described, the audio editing system 602 includes a user interface manager 604. Specifically, the user interface manager 604 facilitates management and display of content in a GUI. The user interface manager 604 can determine which content to display and where to display the content in the GUI. For example, the user interface manager 604 manages a display of content that the user inputs, creates, or modifies, including audio tracks. To illustrate, the user interface manager 604 can provide visual indications of user interactions with content such as waveforms or audio loops.

Additionally, the user interface manager 604 manages display of content that the audio editing system 602 creates or modifies. For instance, the user interface manager 604 can determine that the audio editing system 602 has generated audio loops and modify the GUI to display the generated audio loops. The user interface manager 604 can also allow communicate with one or more of the other components of the audio editing system 602 to determine which content to display and/or when to update content displayed in the GUI. For example, the user interface manager 604 can detect new audio loops, adjustments to audio loops, or removal of audio loops by communicating with the loop generator 610.

The audio editing system 602 also includes a user input manager 606 to facilitate user input. As mentioned, the user can interact with content displayed in the GUI. For example, the user input manager 606 can manage one or more user input devices such as mice, touchscreens, touchpads, or other input devices that allow a user to view, select, and modify content in the GUI. To illustrate, the user input manager 606 can detect user interactions to modify content, select an audio loop, play an audio loop, export an audio loop, or perform other actions associated with generated audio loops. The user input manager 606 can also facilitate the input and editing of audio tracks.

The audio editing system 602 further includes an audio analyzer 608 to analyze audio content. Specifically, the audio analyzer 608 can include an audio segmenter 614 and a score generator 616. The audio segmenter 614 facilitates the segmentation and identification of one or more features of an audio track. For example, the audio segmenter 614 can analyze an audio track to identify individual beats in the audio track. Additionally, the audio segmenter 614 can identify other aspects of the audio track, such as audio features of beats and/or segments in the audio track. The audio segmenter 614 can further identify portions of sequential beats of the audio track that meet one or more length constraints.

The score generator 616 facilitates scoring of portions of the audio track. For example, the score generator 616 generates scores for each portion of the audio track that meets the length constraints. To illustrate, the score generator 616 can analyze each portion of the audio track to compare a beginning and ending beat of each portion to determine a similarity of the beats. Accordingly, the score generator 616 allows the audio editing system 602 to determine a suitability of each portion for use in generating audio loops.

The score generator 616 also facilitates refinement of portions of the audio track. In particular, the score generator 616 can generate scores for segments that include a plurality of beats. To illustrate, the score generator 616 can determine a similarity of a beginning and ending beat of a portion to determine whether the beginning and ending beat are similar/repeating segments of beats. The audio analyzer 608 can use this information to determine whether to exclude one or more beats or segments from a portion to use in generating an audio loop.

Additionally, the audio editing system 602 includes a loop generator 610 that facilitates the generation of audio loops in an audio track. Specifically, the loop generator 610 generates one or more audio loops for portions of an audio track that have scores that meet a threshold. Additionally, the loop generator 610 can generate one or more audio loops based on a comparison of scores of a plurality of portions. To illustrate, the loop generator 610 can generate an audio loop for the highest scoring portion of a plurality of portions. Furthermore, the loop generator 610 can generate audio loops based on manual inputs and modifications to previously generated audio loops.

The audio editing system 602 also includes a data storage manager 612 to store and maintain data on the client device 600. In particular, the data storage manager 612 can communicate with the other components of the audio editing system 602 to store data associated with the audio loop generation processes described herein. The data storage manager 612 can also provide the data to one or more of the components in connection with the audio loop generation processes. For example, the data storage manager 612 can store information including, but not limited to, content that the user is creating/modifying, audio tracks, specific regions of audio tracks, scores associated with portions/segments of an audio track, and audio loops.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

FIG. 7 illustrates a block diagram of exemplary computing device 700 that may be configured to perform one or more of the processes described above. One will appreciate that one or more computing devices such as the computing device 700 may implement the audio editing system 602. As shown by FIG. 7, the computing device 700 can comprise a processor 702, a memory 704, a storage device 706, an I/O interface 708, and a communication interface 710, which may be communicatively coupled by way of a communication infrastructure 712. In certain embodiments, the computing device 700 can include fewer or more components than those shown in FIG. 7. Components of the computing device 700 shown in FIG. 7 will now be described in additional detail.

In one or more embodiments, the processor 702 includes hardware for executing instructions, such as those making up a computer program. As an example and not by way of limitation, to execute instructions for dynamically modifying workflows, the processor 702 may retrieve (or fetch) the instructions from an internal register, an internal cache, the memory 704, or the storage device 706 and decode and execute them. The memory 704 may be a volatile or non-volatile memory used for storing data, metadata, and programs for execution by the processor(s). The storage device 706 includes storage, such as a hard disk, flash disk drive, or other digital storage device, for storing data or instructions for performing the methods described herein.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 710 may facilitate communications with various types of wired or wireless networks. The communication interface 710 may also facilitate communications using various communication protocols. The communication infrastructure 712 may also include hardware, software, or both that couples components of the computing device 700 to each other. For example, the communication interface 710 may use one or more networks and/or protocols to enable a plurality of computing devices connected by a particular infrastructure to communicate with each other to perform one or more aspects of the processes described herein. To illustrate, the audio loop generation process can allow a plurality of devices (e.g., a client device and server devices) to exchange information using various communication networks and protocols for sharing information such as audio tracks, generated audio loops, and application settings.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital media environment comprising pre-recorded electronic audio tracks, a computer-implemented method of generating audio loops, comprising:
   identifying, by at least one processor of a client device, a plurality of portions of an audio track, wherein each portion of the plurality of portions is a possible audio loop comprising a common beginning beat, and each portion of the plurality of portions comprises a different number of beats;
   determining, by the at least one processor, a score for each portion of the plurality of portions of the audio track by determining a similarity of an audio profile of the beginning beat and an audio profile of an ending beat of each portion;
   selecting a portion of the audio track from the plurality of portions of the audio track based on the determined score for each portion; and
   generating, by the at least one processor, an audio loop using the selected portion of the audio track.

2. The computer-implemented method as recited in claim 1, wherein determining the score for each portion comprises determining a plurality of audio features of the common beginning beat and a plurality of audio features of the ending beat of each portion of the plurality of portions.

3. The computer-implemented method as recited in claim 2, wherein the plurality of audio features of the common beginning beat comprises harmony features, timbre features, and energy features of the common beginning beat, and the plurality of audio features of the ending beat of each portion comprises harmony features, timbre features, and energy features of the ending beat of each portion.

4. The computer-implemented method as recited in claim 1, wherein determining the score for each portion further comprises determining a feature distance between the audio profile of the common beginning beat and the audio profile of the ending beat of each portion.

5. The computer-implemented method as recited in claim 4, wherein selecting the portion of the audio track comprises:
   comparing the determined score for each portion of the plurality of portions to one or more other portions of the plurality of portions; and
   selecting the portion of the audio track based on the selected portion having a highest determined score.

6. The computer-implemented method as recited in claim 1, wherein identifying the plurality of portions of the audio track comprises:
   receiving a request to generate at least one audio loop from the audio track as a whole; and
   identifying the plurality of portions of the audio track in response to the received request.

7. The computer-implemented method as recited in claim 6, further comprising generating, in response to the request to generate the at least one audio loop from the audio track as a whole, a plurality of audio loops for the audio track, wherein each generated audio loop for the audio track starts at a different beginning beat in the audio track.

8. The computer-implemented method as recited in claim 1, further comprising:
   identifying a user-selected portion of the audio track, wherein the user-selected portion is less than a whole of the audio track;
   receiving a request to generate an audio loop from the user-selected portion of the audio track; and wherein generating the audio loop comprises refining the user-selected portion to create an audio loop from the user-selected portion.

9. The computer-implemented method as recited in claim 1, wherein generating the audio loop comprises generating a crossfade transition from an ending beat of the selected portion to the common beginning beat of the selected portion by applying the crossfade transition to a tail of the audio track before the ending beat and a tail of the audio track before the common beginning beat.

10. The computer-implemented method as recited in claim 1, further comprising:
identifying, within the selected portion, a first segment and a second segment;
determining that the first segment and the second segment comprise a shared characteristic; and
generating, based on the first segment and the second segment comprising the shared characteristic, the audio loop to include the first segment of the selected portion and exclude the second segment of the selected portion.

11. The computer-implemented method as recited in claim 10, wherein determining that the first segment and the second segment comprise the shared characteristic further comprises determining that a plurality of beats of the first segment are similar to a plurality of beats of the second segment based on at least one audio feature of the plurality of beats of the first segment and at least one audio feature of the plurality of beats of the second segment.

12. The computer-implemented method as recited in claim 1, wherein identifying the plurality of portions of the audio track comprises identifying a plurality of portions that meet a minimum constraint and a maximum constraint.

13. The computer-implemented method as recited in claim 1, further comprising:
providing, within a graphical user interface, a waveform representation of the audio track;
highlighting, in response to generating the audio loop and within the waveform representation of the audio track, the selected portion of the audio track corresponding to the audio loop from the common beginning beat to an ending beat of the selected portion;
providing, within the graphical user interface, a selectable option to play the generated audio loop; and
playing the generated audio loop in response to a selection of the selectable option.

14. In a digital media environment comprising pre-recorded electronic audio tracks, a system for generating audio loops, the system comprising:
a non-transitory computer memory comprising an audio track; and
at least one computing device storing instructions thereon, that, when executed by the at least one computing device, cause the system to:
identify, by the at least one computing device, a portion of the audio track by selecting a beginning beat and an ending beat from among a plurality of beats within the audio track;
determine, by the at least one computing device, a similarity between an audio profile of the beginning beat and an audio profile of the ending beat of the audio track by comparing audio features of the beginning beat to audio features of the ending beat;
determine, by the at least one computing device, that the portion of the audio track is suitable for an audio loop based on the similarity between the beginning beat and the ending beat; and
based on the portion being suitable for the audio loop, generate, by the at least one computing device, the audio loop using the portion of the audio track.

15. The system as recited in claim 14, further comprising instructions that, when executed by the at least one computing device, cause the system to:
identify, within the portion of the audio track, a first segment and a second segment;
determine that a plurality of beats in the first segment and a plurality of beats in the second segment are similar based on the first segment and the second segment comprising a shared characteristic; and
generate, based on the first segment and the second segment comprising the shared characteristic, the audio loop to include the first segment and exclude the second segment of the portion of the audio track.

16. The system as recited in claim 14, further comprising instructions that, when executed by the at least one computing device, cause the system to provide, within a graphical user interface, an indication of the generated audio loop.

17. The system as recited in claim 14, further comprising instructions that, when executed by the at least one processor, cause the system to determine the similarity between the beginning beat and the ending beat of the audio track by:
determining an audio feature distance between the audio profile of the beginning beat and the audio profile of the ending beat of the portion of the audio track; and
determining a score for the portion of the audio track based on the determined feature distance.

18. The system as recited in claim 17, further comprising instructions that, when executed by the at least one processor, cause the system to determine that the portion of the audio track is suitable for the audio loop by determining that the score for the portion of the audio track meets a predetermined threshold.

19. In a digital media environment comprising pre-recorded electronic audio tracks, a computer-implemented method of generating audio loops, comprising:
a step for identifying a plurality of portions of an audio track;
a step for selecting a portion from the plurality of portions of the audio track; and
generating, by at least one processor, an audio loop using the selected portion of the audio track.

20. The method as recited in claim 19, wherein generating the audio loop comprises generating a crossfade transition from an ending beat of the selected portion to a beginning beat of the selected portion by applying the crossfade transition to a tail of the audio track before the ending beat and a tail of the audio track before the beginning beat.

* * * * *